(12) United States Patent
Furukawa

(10) Patent No.: US 10,374,457 B2
(45) Date of Patent: Aug. 6, 2019

(54) WIRELESS TRANSMITTING DEVICE AND WIRELESS TRANSMITTING SYSTEM

(71) Applicant: MITSUMI ELECTRIC CO., LTD., Tokyo (JP)

(72) Inventor: Kenichi Furukawa, Sagamihara (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 110 days.

(21) Appl. No.: 15/504,814

(22) PCT Filed: Nov. 12, 2015

(86) PCT No.: PCT/JP2015/081820
§ 371 (c)(1),
(2) Date: Feb. 17, 2017

(87) PCT Pub. No.: WO2016/076383
PCT Pub. Date: May 19, 2016

(65) Prior Publication Data
US 2017/0279304 A1 Sep. 28, 2017

(30) Foreign Application Priority Data
Nov. 13, 2014 (JP) .................................. 2014-231057

(51) Int. Cl.
*H02J 50/10* (2016.01)
*H02J 50/90* (2016.01)
(Continued)

(52) U.S. Cl.
CPC .............. *H02J 50/10* (2016.02); *G08C 17/02* (2013.01); *H02J 7/0063* (2013.01);
(Continued)

(58) Field of Classification Search
None
See application file for complete search history.

(56) References Cited

U.S. PATENT DOCUMENTS

2004/0150529 A1* 8/2004 Benoit .................. G08C 17/02
340/679
2014/0175880 A1* 6/2014 Miyanaga ............... H02J 7/025
307/29
2018/0104475 A1* 4/2018 Ho ........................ A61N 1/0543

FOREIGN PATENT DOCUMENTS

JP 2007-233941 9/2007
JP 2010-239517 10/2010
(Continued)

Primary Examiner — Jared Fureman
Assistant Examiner — Aqeel H Bukhari
(74) Attorney, Agent, or Firm — Miller Nash Graham & Dunn LLP

(57) ABSTRACT

A wireless transmitting device 1 using electric power supplied from a power generating element 100 which can generate the electric power by utilizing mechanical energy externally applied includes an electric storage element 3 for storing the electric power generated by the power generating element 100; and a wireless transmitting unit 4 for performing a wireless transmitting operation with using the electric power supplied from the electric storage element 3. The wireless transmitting unit 4 is capable of setting a power consumption amount consumed at one time of the wireless transmitting operation. The wireless transmitting device 1 is configured to set timing when the wireless transmitting unit 4 consumes the electric power and the power consumption amount of the wireless transmitting unit 4 according to electromotive force of the power generating element 100.

11 Claims, 16 Drawing Sheets

(51) Int. Cl.
*H02J 7/00* (2006.01)
*G08C 17/02* (2006.01)

(52) U.S. Cl.
CPC ............ *H02J 7/0068* (2013.01); *H02J 50/90* (2016.02); *G08C 2201/112* (2013.01)

(56) References Cited

FOREIGN PATENT DOCUMENTS

| | | |
|---|---|---|
| JP | 2011-013765 | 1/2011 |
| JP | 2011-172352 | 9/2011 |
| JP | 2017-215631 | 11/2014 |
| WO | 2013/046505 | 4/2013 |

\* cited by examiner

WIRELESS TRANSMITTING DEVICE AND WIRELESS TRANSMITTING SYSTEM

FIELD OF THE INVENTION

The present invention generally relates to wireless transmitting devices and wireless transmitting systems, in particular to a wireless transmitting device and a wireless transmitting system using electric power supplied from a power generating element which generates the electric power by utilizing mechanical energy externally applied.

In recent years, there has been developed systems which can collect detected data of various sensors (such as a humidity sensor, a temperature sensor, a vibration sensor, a gas concentration sensor, a human-detection sensor, an acceleration sensor and a $CO_2$ sensor) with wireless transmission and analyze the collected detected data to perform state measuring, automatic control and the like of various targets (such as a device, a building and an environment). Among these systems, a system, which can detect vibration of a rotating device, a facility containing the rotating device or the like with a vibration sensor and evaluate components of the vibration to monitor or diagnose abnormality and failure of the rotating device, the facility or the like, has a wide range of availability and is especially useful.

In the case of detecting and evaluating the vibration, it is required to set a sampling frequency of the vibration sensor to be about several times to about ten times of a frequency of the vibration of the target to be detected. Thus, even if a driving time of the vibration sensor is short, an amount of the detected data to be transmitted becomes enormous. Thus, an amount of electric power required for wirelessly transmitting the detected data is much larger than an amount of electric power required for detecting the vibration with the vibration sensor.

In the system as described above, in order to ensure the amount of electric power required for wirelessly transmitting enormous detected data of a sensor, there has been proposed to use an energy harvesting device which can generate electric power with utilizing a various kinds of mechanical energy externally applied. For example, an energy harvesting device disclosed by patent document 1 is attached to a vibrating body such as an air conditioning duct in a building and generates electric power with utilizing vibration energy applied from the vibrating body.

However, in the case of utilizing the vibration of the air conditioning duct in the building for generating the electric power as is the case for the energy harvesting device disclosed by the patent document 1, vibration properties (such as a vibration frequency and an amplitude) of the air conditioning duct vary due to factors such as a set temperature of an air conditioner in the building and an ambient temperature. Generally, properties of the mechanical energy externally applied to the energy harvesting device vary due to various factors such as a location, a time, a season and a weather situation as described above, thus the properties of the mechanical energy are not constant. Therefore, it is difficult to estimate actual electromotive force (power generation property) of the energy harvesting device in advance.

Generally, a power generating element can be considered to be equivalent to an element obtained by connecting a battery having electro motive force $E_0$ (V) and an internal resistance having a resistance value $R_0$ (Ω) in series as illustrated in FIG. 1. In the case of connecting the power generating element to a load resistance having a resistance value $R_1$ (Ω) and allowing current I (A) to flow in the circuit, it is well-known that electric power generated by the power generating element can be most efficiently consumed by setting the resistance value $R_1$ of the load resistance to be equal to the resistance value $R_0$ of the internal resistance. At this time, a power consumption amount $W_0$ (W) consumed by the power generating element and the load resistance can be expressed by the following equation (1). Further, from a condition of "$R_0 = R_1$", a total power consumption amount consumed by the load resistance becomes 50% of the power consumption amount $W_0$.

$$W_0 = IE_0 = \frac{E_0^2}{2 \times R_0} \tag{1}$$

Further, as shown in FIG. 2, it is commonly performed to connect an electric storage element such as a capacitor to the power generating element for storing the electric power generated by the power generating element. In an example shown in FIG. 2, a switching element SW is provided between the power generating element and the electric storage element. In this example, when the switching element is turned to an ON state, the electric power is supplied from the power generating element to the electric storage element and the electric power is stored in the electric storage element. In the circuit as described above, the storage of the electric power into the electric storage element can be considered to be power consumption by the electric storage element. Thus, the electric storage element can be referred to as "capacity load".

A voltage E of the electric storage element, the current I flowing in the circuit and a power amount W stored in the electric storage element having a capacitance C (F) (that is a power consumption amount consumed by the electric storage element) vary with the lapse of time t (s) and values of these parameters can be respectively expressed by the following equations (2), (3) and (4). Further, a ratio of the total power consumption amount $W_0$ at the time of connecting the described load resistance and the total power consumption amount W at the time of connecting the electric storage element is referred to as "power consumption efficiency η" and can be expressed by the following equation (5).

$$E = E_0\left(1 - e^{-\frac{t}{CR_0}}\right) \tag{2}$$

$$I = \frac{1}{R_0} \times (E_0 - E) \tag{3}$$

$$W = I \times E \tag{4}$$

$$\eta = \frac{W}{W_0} \tag{5}$$

Time variations of the voltage E of the electric storage element, the current I flowing in the circuit and the power consumption efficiency η under conditions of the resistance value $R_0$ of the internal resistance is 2000 (Ω), the electromotive force $E_0$ of the power generating element is 2 (V) and the capacitance C of the electric storage element is 500 (μF) in the circuit shown in FIG. 2 are shown in FIG. 3. As is clear from FIG. 3, when the time t is zero (s) (t=0 (s)), the voltage E is zero (V) (E=0 (V)). This indicates that the electric power is not stored in the electric storage element. On the other hand, when the time t is sufficiently large, the voltage E is approximately equal to the electromotive force $E_0$=2

(V) (that is, $E \approx E_0 = 2$ (V)). This indicates that electric power over the electromotive force $E_0$ of the power generating element cannot be stored in the electric storage element. Further, when a condition of "$E = E_0/2$ (that is, the voltage $E$ at the time of $t=0.7)=1$(V)" is satisfied, the power consumption efficiency $\eta$ becomes a maximum efficiency of 50% as in the case of connecting the load resistance. This is because an impedance of the electric storage element and an impedance of the power generating element (the resistance value $R_0$ of the internal resistance) match with each other at the time when the voltage $E$ becomes equal to $E_0/2$ ($E = E_0/2$). This indicates that the circuit shown in FIG. 2 becomes equivalent to the circuit which is shown in FIG. 1 and satisfies the condition of "$R_0 = R_1$" in the aspect of the power consumption efficiency $\eta$ as a result of the matching of the impedances.

The power amount W stored in the electric storage element can be expressed by the following expression (6). FIG. 4 is a view showing time variations of the power amount W and the voltage $E$ of the electric storage element. As is clear from FIG. 4, a slope of the power amount W, which indicates an electric storage efficiency of the electric power (the power consumption efficiency $\eta$ of the electric storage element), with respect to the time t becomes maximum in the vicinity of $t=0.7$ (s) ($t \approx 0.7$ (s)), that is when the voltage $E$ of the electric storage element is in the vicinity of $E_0/2$ ($E \approx E_0/2$).

$$W = \frac{C \times E^{\wedge 2}}{2} \quad (6)$$

As described above, when the electric storage element is connected to the power generating element, the voltage $E$ of the electric storage element varies depending on the time t. Thus, a condition for providing a high power consumption efficiency $\eta$, that is a condition for efficiently storing the electric power in the electric storage element is that the voltage $E$ of the electric storage element is in the vicinity of $E_0/2$ ($E \approx E_0/2$). Generally, the electromotive force $E_0$ of the power generating element is constant. Thus, it is easy to control the storage of the electric power into the electric storage element and discharging (consumption) of the electric power from the electric storage element so that the voltage $E$ of the electric storage element becomes in the vicinity of $E_0/2$ ($E \approx E_0/2$). However, as described above, the actual electromotive force $E_0$ of the energy harvesting element varies depending on the various factors. Thus, in the case of using the energy harvesting element, it is difficult to control the storage of the electric power into the electric storage element and the discharging (consumption) of the electric power from the electric storage element so that the voltage $E$ of the electric storage element becomes in the vicinity of $E_0/2$ ($E \approx E_0/2$).

Further, in order to wirelessly transmit the detected date of the sensor to an external device, it is required to consume the electric power generated by the energy harvesting element at a downstream wireless transmitting unit. However, since the mechanical energy externally applied to the energy harvesting element is generally very small, the energy harvesting element cannot ensure a power amount required for always activating the wireless transmitting unit. Thus, it is required to temporarily store the electric power generated by the energy harvesting element in the electric storage element to make the power amount stored in the electric storage element equal to or larger than a predetermined amount and then supply the stored electric power to the wireless transmitting unit as shown in FIG. 5.

As described above, the actual electromotive force $E_0$ of the energy harvesting element varies depending on the various factors. Thus, a conventional art sets a time interval for supplying the electric power to the wireless transmitting unit (a power storage time for storing the electric power into the electric storage element) to be long for reliably ensuring a power amount, which is larger than the power consumption amount of the wireless transmitting unit, in the electric storage element. FIG. 6 indicates time variations of the voltage $E$ of the electric storage element and the power consumption efficiency $\eta$ in the case of performing the above-described operation. In FIG. 6, "$\Delta t$" represents a time interval for supplying the electric power to the wireless transmitting unit and "$\Delta E$" represents a decreasing amount of the voltage $E$ of the electric storage element caused by the power consumption of the wireless transmitting unit. In an example shown in FIG. 6, the electromotive force $E_0$ of the power generating element is 2 (V).

As shown in FIG. 6, in the case of setting the time interval $\Delta t$ to be long, although the power consumption efficiency $\eta$ reaches 50% at the time when the voltage $E$ of the electric storage element reaches $E_0/2$, the power consumption efficiency decreases to about 15% at the timing when the electric power is supplied to the wireless transmitting unit. Thus, the power consumption efficiency $\eta$ becomes very low on average. This results in a problem that an average transmitting rate of data decreases. On the other hand, in the case of setting the time interval $\Delta t$ to be short for increasing the average transmitting rate of data, there is a problem that the power amount, which is larger than the power consumption amount of the wireless transmitting unit, cannot be reliably stored in the electric storage element because the actual electromotive force $E_0$ of the energy harvesting element varies.

RELATED ART

Patent Document

Patent document 1: JP 2011-172352A

SUMMARY OF THE INVENTION

Problems to be Solved by the Invention

The present invention has been made in view of the problem mentioned above. Accordingly, it is an object of the present invention to provide a wireless transmitting device and a wireless transmitting system which can perform wireless transmission with a high power consumption efficiency and a high average transmitting rate with utilizing electric power supplied from an energy harvesting element.

Means for Solving the Problems

The above object is achieved by the present inventions defined by the following (1) to (10).

(1) A wireless transmitting device using electric power supplied from a power generating element which can generate the electric power by utilizing mechanical energy externally applied, the wireless transmitting device comprising:

an electric storage element for storing the electric power generated by the power generating element; and a wireless transmitting unit for performing a wireless transmitting operation with using the electric power supplied from the electric storage element, the wireless transmitting unit being capable of setting a power consumption amount consumed at one time of the wireless transmitting operation, wherein the wireless transmitting device is configured to set a timing when the wireless transmitting unit consumes the electric power and the power consumption amount of the wireless transmitting unit according to electromotive force of the power generating element.

(2) The wireless transmitting device according to the above (1), wherein when the electromotive force of the power generating element is defined as "$E_0$", a voltage of the electric storage element at the timing when the wireless transmitting unit consumes the electric power is defined as "$E_1$" and a voltage of the electric storage element after the wireless transmitting unit consumes the electric power is defined as "$E_2$", the wireless transmitting device sets the timing and the power consumption amount so that a condition of "$0.3E_0 \leq (E_1+E_2)/2 \leq 0.7E_0$" is satisfied.

(3) The wireless transmitting device according to the above (2), wherein the wireless transmitting device sets the timing and the power consumption amount so that the voltage $E_1$ and the voltage $E_2$ respectively satisfy conditions of "$0.5E_0 < E_1 \leq 0.7E_0$" and "$0.3E_0 \leq E_2 < 0.5E_0$".

(4) The wireless transmitting device according to any one of the above (1) to (3), further comprising:
a switching unit for switching between a charging mode for storing the electric power generated by the power generating element in the electric storage element and an opening mode for disconnecting a connection between the power generating element and the electric storage element to allow the power generating element to be in an opened state; and
an electromotive force detecting unit for detecting the electromotive force of the power generating element in the opening mode.

(5) The wireless transmitting device according to the above (4), wherein the electromotive force detecting unit detects the electromotive force of the power generating element before the wireless transmitting unit consumes the electric power.

(6) The wireless transmitting device according to the above (4) or (5), wherein the electromotive force detecting unit periodically detects the electromotive force of the power generating element.

(7) The wireless transmitting device according to any one of the above (1) to (3), further comprising a voltage detecting unit for detecting a voltage of the electric storage element,
wherein the wireless transmitting device estimates the electromotive force of the power generating element by detecting the voltage of the electric storage element multiple times.

(8) The wireless transmitting device according to the above (7), wherein the wireless transmitting device detects the voltage of the electric storage element multiple times and estimates the voltage of the electric storage element as the electromotive force of the power generating element when a variation amount of the voltage of the electric storage element becomes equal to or less than a predetermined value.

(9) The wireless transmitting device according to the above (7), further comprising a timer for measuring a time interval taken for increasing the voltage of the electric storage element by a predetermined amount,
wherein the wireless transmitting device estimates the electromotive force of the power generating element based on the estimated time interval.

(10) A wireless transmitting system, comprising:
a power generating element which can generate electric power by utilizing mechanical energy externally applied; and
the wireless transmitting device defined by any one of the above (1) to (9).

Effects of the Invention

According to the present invention, it is possible to set the timing when the wireless transmitting unit consumes the electric power and the power consumption amount of the wireless transmitting unit according to the electromotive force of the energy harvesting element. Thus, it is possible to perform the wireless transmission with a high power consumption efficiency and a high average transmitting rate with using the electric power supplied from the energy harvesting element.

DETAILED DESCRIPTION OF THE PREFERRED EMBODIMENTS

Hereinafter, description will be given to a wireless transmitting device and a wireless transmitting system of the present invention with reference to preferred embodiments shown in the accompanying drawings. In the following description, although the wireless transmitting device and the wireless transmitting system of the present invention use a power generating element which can generate electric power with utilizing mechanical energy externally applied, the present invention is not limited thereto. For example, a various kinds of energy harvesting elements which can generate electric power with utilizing a various kinds of mechanical energy such as external force can be used in the wireless transmitting device and the wireless transmitting system of the present invention.

First Embodiment

First, description will be given to a wireless transmitting device and a wireless transmitting system according to a first embodiment of the present invention.

Figure 1:
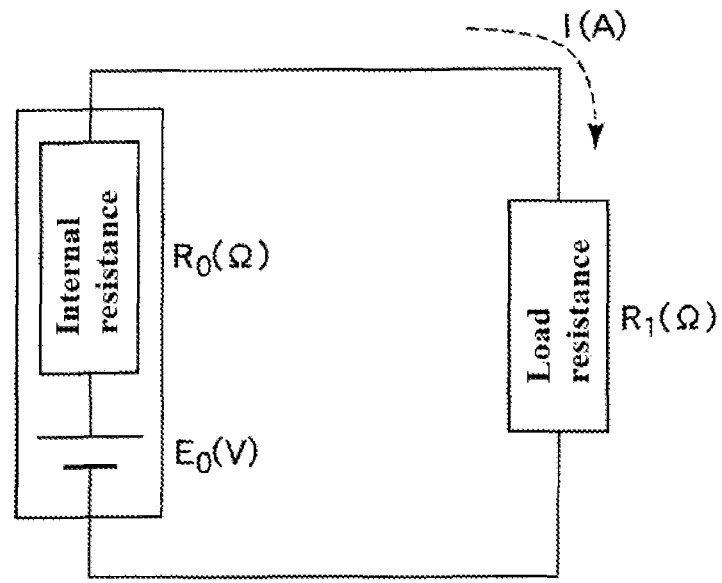
FIG. 1 is a view for explaining power consumption at the time of connecting a load resistance to a power generating element.
Figure 2:
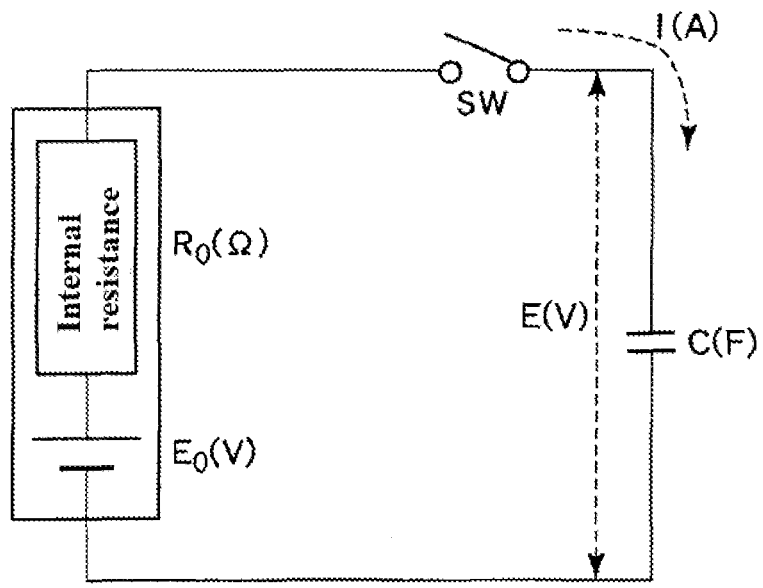
FIG. 2 is a view for explaining power consumption at the time of connecting an electric storage element to the power generating element.
Figure 3:
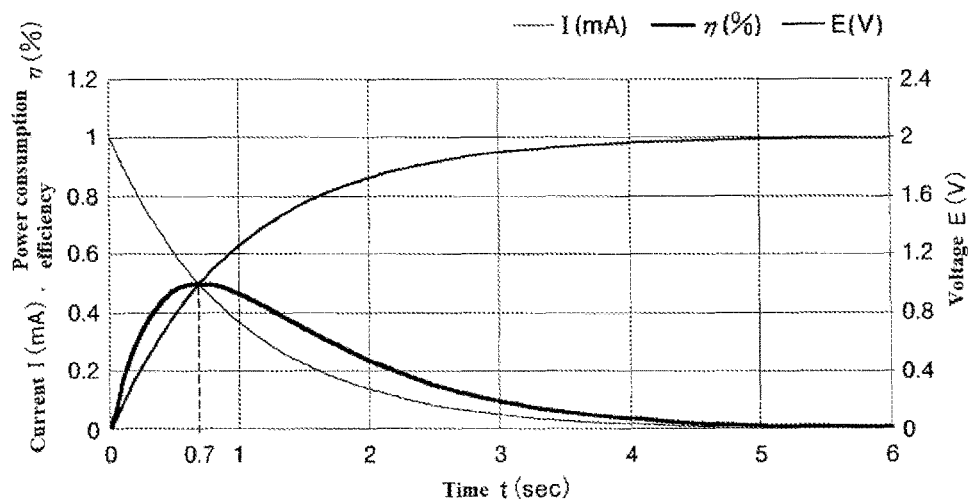
FIG. 3 is a graph showing time variations of a voltage E of the electric storage element in a circuit shown in FIG. 2, current I flowing in the circuit and a power consumption efficiency η.
Figure 4:
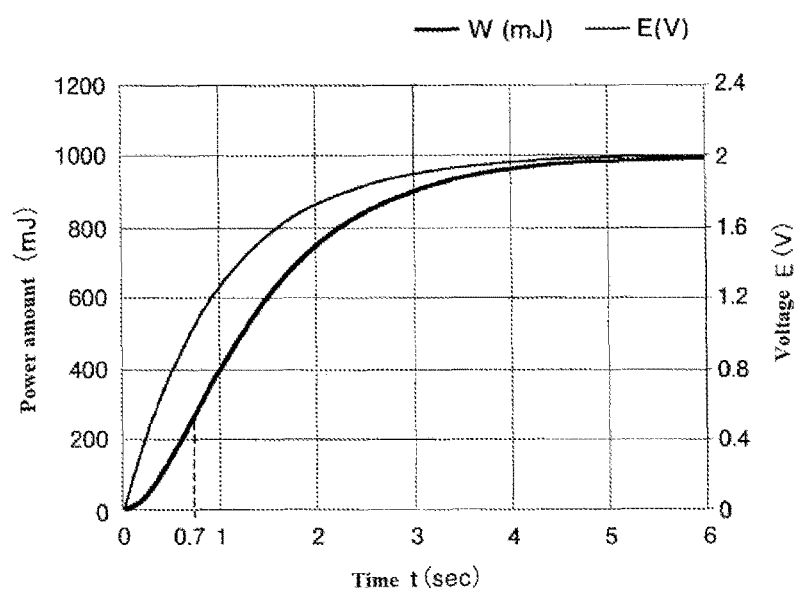
FIG. 4 is a graph showing time variations of the voltage E and a power amount W stored in the electric storage element in the circuit shown in FIG. 2.
Figure 5:
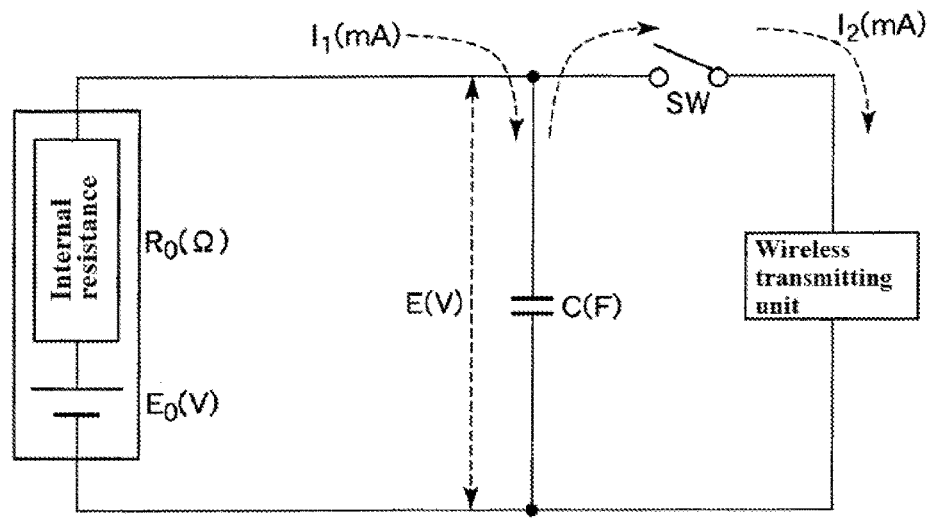
FIG. 5 is a view showing one example of a wireless transmitting device using the power generating element.
Figure 6:
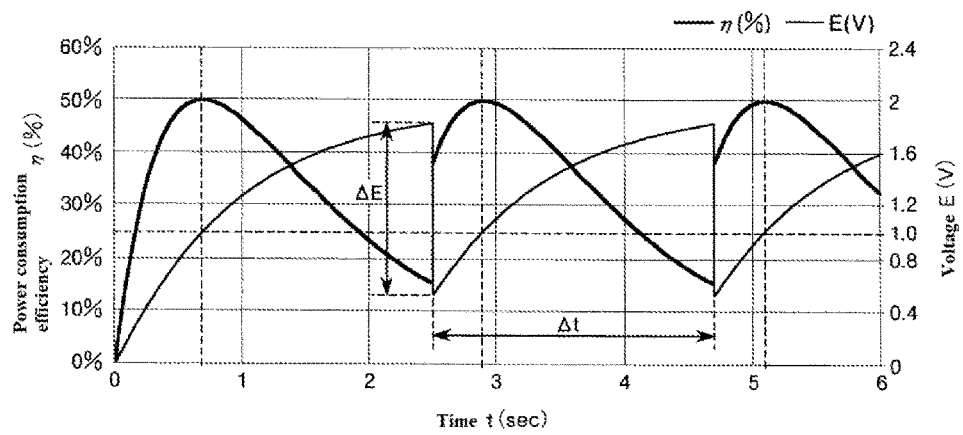
FIG. 6 is a graph showing time variations of the voltage E of the electric storage element and the power consumption efficiency η in the wireless transmitting device shown in FIG. 5.
Figure 7:
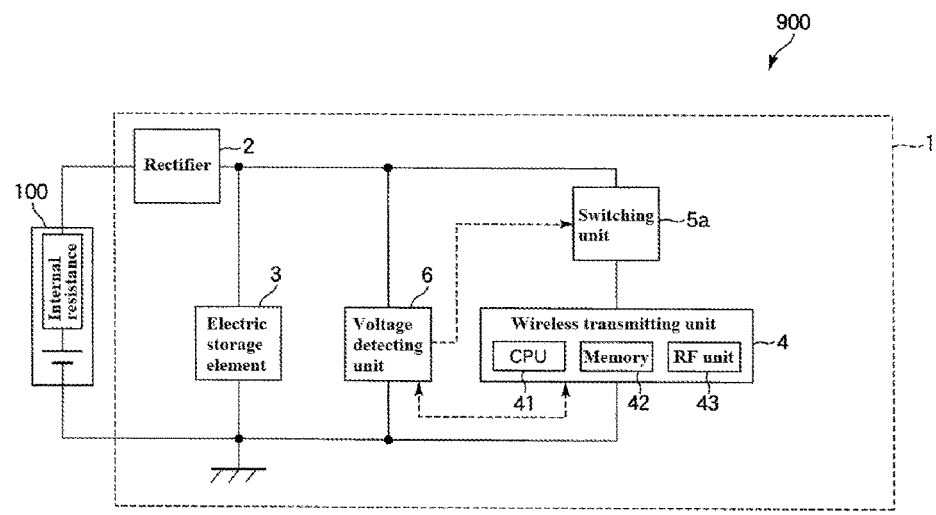
FIG. 7 is a view showing a wireless transmitting device and a wireless transmitting system according to a first embodiment of the present invention.
Figure 8:
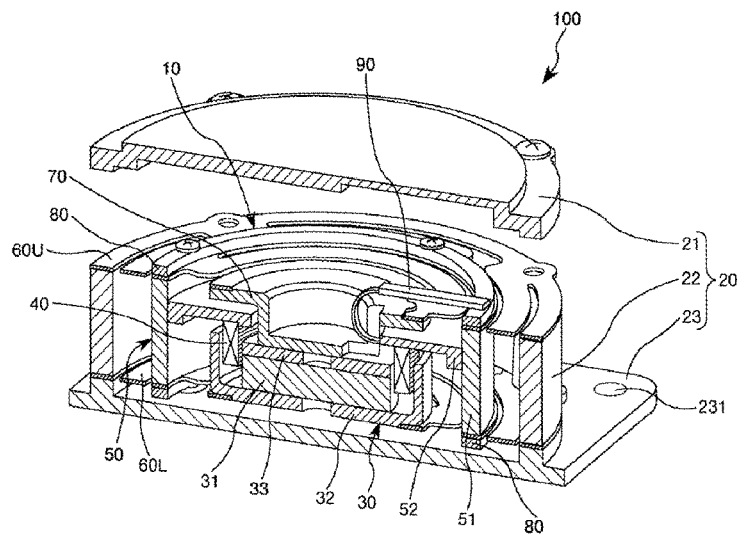
FIG. 8 is a cross-sectional perspective view of a power generating element shown in FIG. 7.
Figure 9:
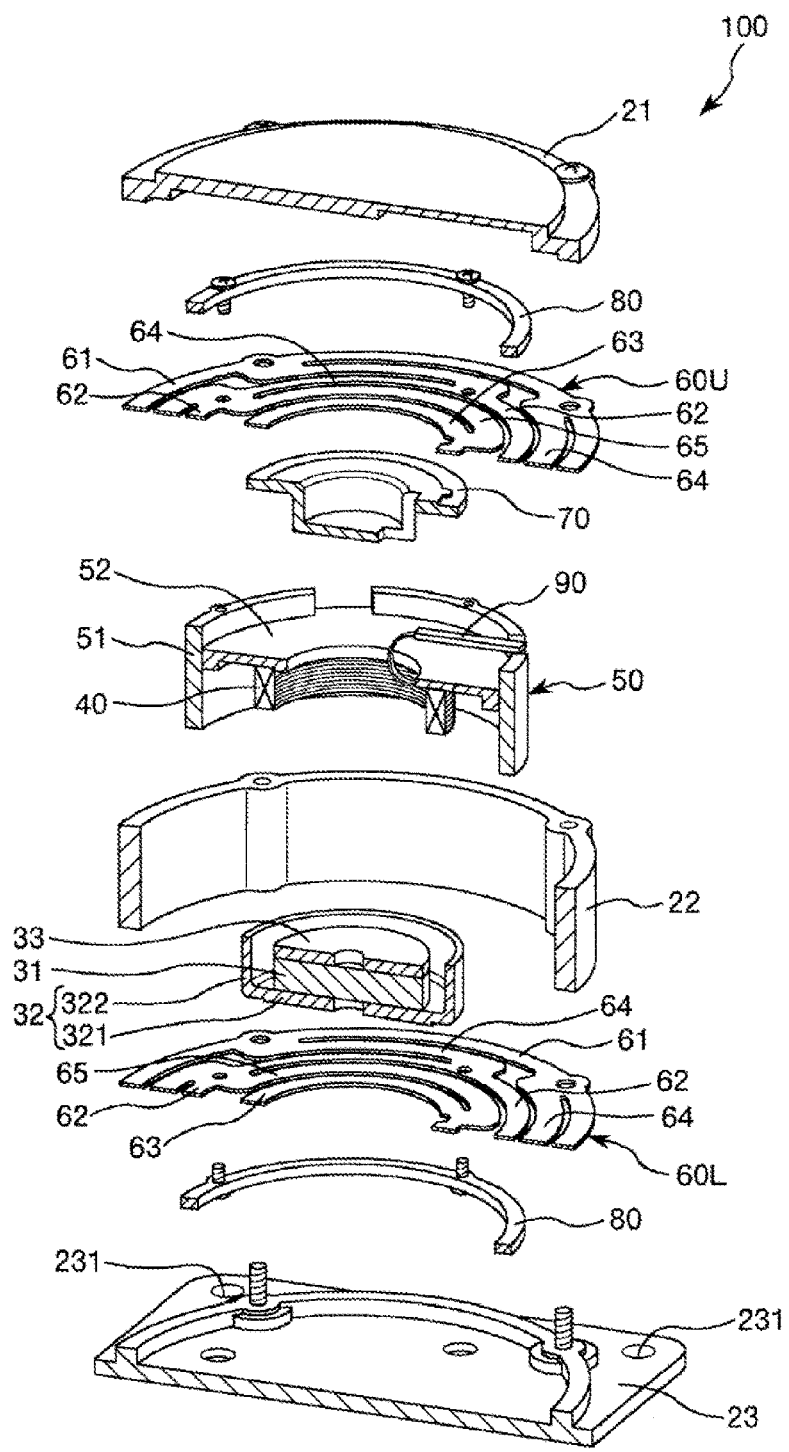
FIG. 9 is an exploded perspective view of the power generating element shown in FIG. 7.
Figure 10:
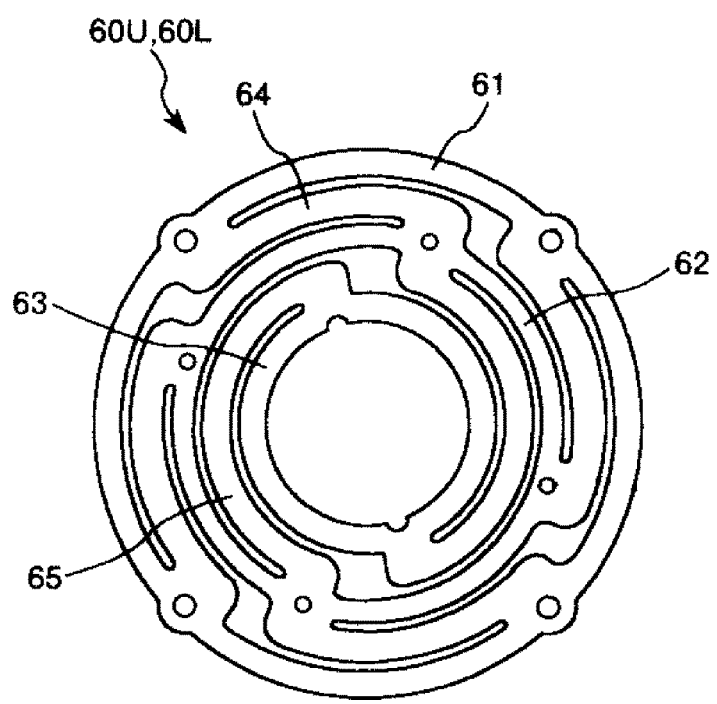
FIG. 10 is a planar view of a leaf spring included in the power generating element shown in FIG. 7.
Figures 11, 12:
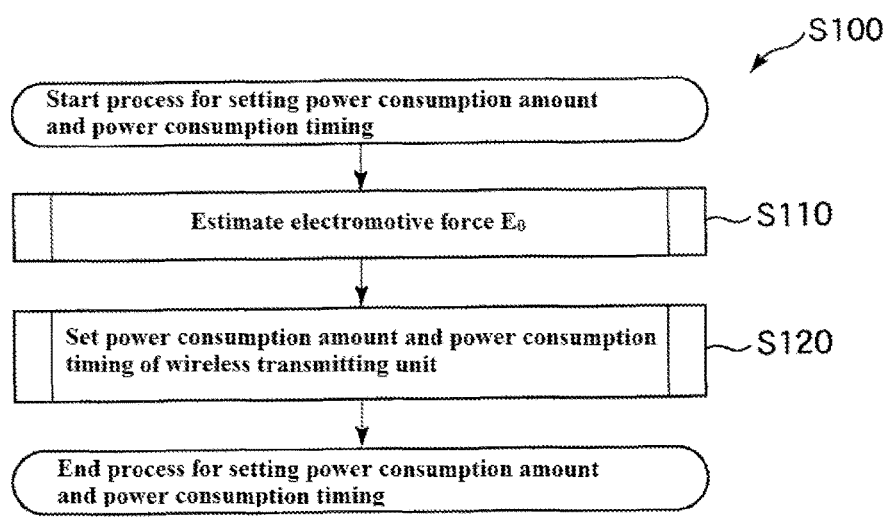
FIG. 11 is a view showing one example of a data table group for associating electromotive force $E_0$ of the power generating element with a power consumption amount W and a power consumption timing. The data table group is stored in a memory shown in FIG. 7.
FIG. 12 is a flowchart showing a process for setting the power consumption amount W and the power consumption timing. This process is performed by the wireless transmitting device shown in FIG. 7.

FIG. 7 is a view showing the wireless transmitting device and the wireless transmitting system according to the first embodiment of the present invention. FIG. 8 is a cross-sectional perspective view of a power generating element shown in FIG. 7. FIG. 9 is an exploded perspective view of the power generating element shown in FIG. 7. FIG. 10 is a planar view of a leaf spring included in the power generating element shown in FIG. 7. FIG. 11 is a view showing one example of a data table group for associating electromotive force $E_O$ of the power generating element with a power consumption amount W and a power consumption timing. The data table group is stored in a memory shown in FIG. 7. Hereinafter, an upper side in each of FIGS. 8 and 9 is referred to as "upper" or "upper side" and a lower side in each of FIGS. 8 and 9 is referred to as "lower" or "lower side".

A wireless transmitting system 900 shown in FIG. 7 includes a power generating element (energy harvesting element) 100 which can generate electric power with utilizing vibration (vibration energy) externally applied and a wireless transmitting device 1 for performing a wireless transmitting operation with using the electric power supplied from the power generating element 100.

<<Power Generating Element 100>>

The power generating element 100 is used in a state that the power generating element 100 is fixedly attached to a vibrating body and generates the electric power with utilizing vibration applied from the vibration body. Examples of the vibrating body include a rotating device (such as a motor, a turbine and a fan), an air conditioning duct, a pipe, a transportation (such as a freight train, an automobile and a back of truck), a crosstie (skid) for railroad, an express highway or a tunnel, a bridge, a pump and a pipe for transferring oil pressure and air pressure.

As shown in FIGS. 8 and 9, the power generating element 100 includes a housing 20 and a power generating unit 10 supported in the housing 20 so that the power generating unit 10 can be vibrated in a vertical direction in FIGS. 8 and 9. The power generating unit 10 has a pair of an upper leaf spring 60U and a lower leaf spring 60L opposed to the upper leaf spring 60U, a magnet assembly 30 supported between the pair of leaf springs 60L, 60U and having a permanent magnet 31 and supported between the pair of leaf springs 60U, 60L, a coil 40 provided on the outer peripheral side of the permanent magnet 31 so as to surround the permanent magnet 31 and a coil holding portion 50 for holding the coil 40.

The housing 20 has a function of fixing the power generating element 100 to the vibrating body and containing the power generating unit 10 therein. The housing 20 has a cover 21, a base 23 and a cylindrical portion 22 provided between the cover 21 and the base 23.

Through-holes 231 are respectively formed in four corner portions of the base 23. Screws (not shown in the drawings) are respectively inserted through the through-holes 231 of the base 23 and screwed with threaded holes formed in the vibrating body. With this operation, it is possible to fix the base 23 to the vibrating body, thereby attaching (fixing) the power generating element 100 to the vibrating body. By attaching the power generating element 100 to the vibrating body, it is possible to transfer the vibration of the vibrating body to the power generating element 100.

The pair of the upper leaf spring 60U and the lower leaf spring 60L have a function of supporting the magnet assembly 30 and the coil holding portion 50 so that the magnet assembly 30 and the coil holding portion 50 can be vibrated with respect to the housing 20. The upper leaf spring 60U is fixed between the cover 21 and the cylindrical portion 22. On the other hand, the lower leaf spring 60L is fixed between the base 23 and the cylindrical portion 22. Each of the leaf springs 60L, 60U is a component having a circular shape and formed of a metallic-thin plate and has the same configuration with each other.

As shown in FIG. 10, each of the leaf springs 60L, 60U has a first circular portion 61, a second circular portion 62 having an outer diameter smaller than an inner diameter of the first circular portion 61 and a third circular portion 63 having an outer diameter smaller than an inner diameter of the second circular portion 62. In each of the leaf springs 60L, 60U, the first circular portion 61, the second circular portion 62 and the third circular portion 63 are arranged from the outside to the inside thereof in this order. Further, the first circular portion 61, the second circular portion 62 and the third circular portion 63 are arranged concentrically in each of the leaf springs 60L, 60U. The first circular portion 61 is coupled with the second circular portion 62 through a plurality of first spring portions 64 (in this embodiment, the number of the first spring portions 64 is four). The second circular portion 62 is coupled with the third circular portion 63 through a plurality of second spring portions 65 (in this embodiment, the number of the second spring portions 65 is two).

The second circular portion 62 of the upper leaf spring 60U is fixed to an upper end of an outer peripheral portion (cylindrical portion 51) of the coil holding portion 50 in a state that the upper leaf spring 60U is positioned between a washer 80 provided on the upper side of the upper leaf spring 60U and the coil holding portion 50. Further, the second circular portion 62 of the lower leaf spring 60L is fixed to a lower end of the outer peripheral portion (cylindrical portion 51) of the coil holding portion 50 in a state that the lower leaf spring 60L is positioned between a washer 80 provided on the lower side of the lower leaf spring 60L and the coil holding portion 50.

The third circular portion 63 of the upper leaf spring 60U is fixed to an upper portion of a spacer 70 attached on the after-mentioned magnet assembly 30. The third circular portion 63 of the lower leaf spring 60L is fixed to a bottom portion of the magnet assembly 30.

The four first spring portions 64 in each of the leaf springs 60L, 60U support the second circular portion 62 (couple the second circular portion 62 with the first circular portion 61) in a state that the second circular portion 62 can be vibrated with respect to the first circular portion 61 in the vertical direction in FIGS. 8 and 9. As described above, each of the first circular portions 61 is fixed to the housing 20 (the cover 21, the cylindrical portion 22 and the base 23). Further, each of the second circular portions 62 is fixed to the coil holding portion 50. Therefore, when the vibration of the vibrating body is transferred to the housing 20, this vibration is further transferred to the coil holding portion 50 through the first spring portions 64. As a result, the coil holding portion 50 can be vibrated with respect to the housing 20.

On the other hand, the two second spring portions 65 in each of the leaf springs 60L, 60U support the third circular portion 63 (couple the third circular portion 63 with the second circular portion 62) in a state that the third circular portion 63 can be vibrated with respect to the second circular portion 62 in the vertical direction in FIGS. 8 and 9. As described above, the third circular portion 63 of the upper leaf spring 60U is fixed to the magnet assembly 30 through the spacer 70 and the third circular portion 63 of the lower leaf spring 60L is fixed to the bottom portion of the magnet assembly 30. Therefore, when the vibration of the vibrating body is transferred to the housing 20, this vibration is further transferred to the magnet assembly 30 through the second spring portions 65. As a result, the magnet assembly 30 can be vibrated with respect to the housing 20 and the coil holding portion 50.

In the power generating element 100 having the above structure, a first vibration system and a second vibration system are constructed. In the first vibration system, the coil holding portion 50 is vibrated with respect to the housing 20 through the first spring portions 64 of each leaf spring 60U, 60L. In the second vibration system, the magnet assembly 30 is vibrated with respect to the housing 20 and the coil holding portion 50 through the second spring portions 65 of each leaf spring 60U, 60L.

The magnet assembly 30 is supported between the upper leaf spring 60U and the lower leaf spring 60L so that the magnet assembly 30 can be vibrated with respect to the housing 20 and the coil holding portion 50. The magnet assembly 30 includes the permanent magnet 31 having a discoid shape (a columnar shape having a relatively thin thickness); a cylindrical back yoke 32 having a bottom plate portion 321 on which the permanent magnet 31 is provided at a substantially center position thereof and a cylindrical portion 322 provided to stand on an outer edge portion of the bottom plate portion 321; and a yoke 33 provided on an upper surface of the permanent magnet 31. An outer peripheral portion of the bottom plate portion 321 of the back yoke 32 is fixed to the third circular portion 63 of the lower leaf spring 60L. The yoke 33 is fixed to the third circular portion 63 of the upper leaf spring 60U through the spacer 70.

The back yoke 32 is configured so that the coil 40 held between the cylindrical portion 322 and the permanent magnet 31 (the yoke 33) by the coil holding portion 50 is spaced apart from the cylindrical portion 322 and the permanent magnet 31. Namely, an inner diameter of the cylindrical portion 322 is designed to be larger than an outer diameter of the coil 40. Further, a through-hole is formed in the vicinity of a central portion of the bottom plate portion 321 of the back yoke 32.

The coil holding portion 50 is supported between the magnet assembly 30 and the housing 20 so that the coil holding portion 50 can be vibrated with respect to the housing 20 and the magnet assembly 30. The coil holding portion 50 includes a cylindrical portion 51 and a ring-shaped portion 52 provided on the inner peripheral side of the cylindrical portion 51. The cylindrical portion 51 is fixed to the second circular portion 62 of each leaf spring 60U, 60L. The coil holding portion 50 holds the coil 40 on the lower surface side of the ring-shaped portion 52.

The coil 40 is held by the coil holding portion 50 in a state that the coil 40 is fixed in the vicinity of an inner peripheral portion of a lower surface of the ring-shaped portion 52 of the coil holding portion 50. Further, the coil 40 is arranged between the cylindrical portion 322 of the back yoke 32 of the magnet assembly 30 and the permanent magnet 31 so as to be spaced apart from the cylindrical portion 322 and the permanent magnet 31 in a state that the coil 40 is held by the coil holding portion 50. The coil 40 can be relatively displaced with respect to the permanent magnet 31 in the vertical direction due to the vibration of the power generating unit 10 (the vibration of the coil holding portion 50 and the vibration of the magnet assembly 30). At this time, density of magnetic lines generated from the permanent magnet 31 and passing through the coil 40 varies, and thus alternating current is generated in the coil 40.

Both ends of the coil 40 are respectively connected with a pair of electrode terminals 90 provided on the upper side of the ring-shaped portion 52 of the coil holding portion 50. By connecting the electrode terminals 90 to input terminals of the wireless transmitting device 1, it is possible to utilize the power generating element 100 as a power source for the wireless transmitting device 1.

<<Wireless Transmitting Device 1>>

The wireless transmitting device 1 is communicatively connected to a sensor (not shown in the drawings for this embodiment) and has a function of wirelessly transmitting detected data received from the sensor to an external device such as a server and a control device with using the electric power supplied from the power generating element 100. Although the sensor communicatively connected to the wireless transmitting device 1 is not particularly limited to a specific kind, the case of using a vibration sensor as the sensor will be described in this embodiment. In this regard, a connection between the wireless transmitting device 1 and the vibration sensor may be a wire connection or a wireless connection.

As shown in FIG. 7, the wireless transmitting device 1 includes a rectifier 2 for rectifying the electric power supplied from the power generating element 100, an electric storage element 3 for storing the electric power rectified by the rectifier 2, a wireless transmitting unit 4 for wirelessly transmitting the detected data received from the sensor to the external device, a switching unit 5a for switching between a charging mode for storing the electric power in the electric storage element 3 and a power consumption mode for supplying the electric power from the electric storage element 3 to the wireless transmitting unit 4 to consume the electric power and a voltage detecting unit 6 for detecting a voltage E of the electric storage element 3.

Further, in the wireless transmitting device 1, a data bus or the like communicatively connects at least between the voltage detecting unit 6 and the wireless transmitting unit 4 and between the switching unit 5a and the wireless transmitting unit 4. In addition, the voltage detecting unit 6 is communicatively connected to the switching unit 5a. When the voltage E of the electric storage element 3 exceeds a trigger voltage $E_1$, the voltage detecting unit 6 transmits a power consumption start signal to the switching unit 5a. The switching unit 5a switches the mode to the power consumption mode based on the power consumption start signal received from the voltage detecting unit 6. Thus, in this embodiment, a timing when the switching unit 5a switches the mode to the power consumption mode, that is a timing when the electric power is supplied from the electric storage element 3 to the wireless transmitting unit 4 and consumed by the wireless transmitting unit 4 (hereinafter, this timing is referred to as "power consumption timing" simply) depends on the trigger voltage $E_1$.

The rectifier 2 is connected to at least one of the electrode terminals 90 of the power generating element 100 and has a function of rectifying the electric power supplied from the power generating element 100. The rectifier 2 is not particularly limited to a specific kind as long as it can rectify the electric power supplied from the power generating element 100. For example, it is possible to use a diode rectifier, a bridge rectifier and the like as the rectifier 2.

The electric storage element 3 is connected between the rectifier 2 and the other one of the electrode terminals 90 of the power generating element 100 and has a function of storing and emitting (charging and discharging) the electric power rectified by the rectifier 2. For example, it is possible to use a capacitor such as an electric double layer capacitor and a lithium ion capacitor as the electric storage element 3. These capacitors are suitable for the electric storage element 3 because these capacitors have a compact size and can perform quick charge. Further, it may be possible to use a combination of the capacitor and a secondary battery (rechargeable battery) such as a zinc battery, a lithium ion battery and a nickel hydride battery as the electric storage element 3. In this case, when the electric power exceeding a capacitance of the capacitor is supplied to the electric storage element 3, it is possible to store excess electric power in the secondary battery. Thus, it is possible to efficiently use the electric power supplied from the power generating element 100.

The wireless transmitting unit 4 is connected to both end terminals of the electric storage element 3 through the switching unit 5a and has a function of performing a wireless transmitting operation for the detected date of the sensor with using the electric power supplied from the electric storage element 3. The wireless transmitting unit 4 includes a CPU (Central Processing Unit) 41 for controlling the wireless transmitting unit 4, a memory 42 and an RF unit 43 for wirelessly transmitting a predetermined amount of the detected data to the external device.

The memory 42 stores the detected data received from the sensor communicatively connected to the wireless transmitting device 1, a data amount to be transmitted at one time of the wireless transmitting operation and a data table group shown in FIG. 11.

The detected data received from the sensor is stored in the memory 42 with a FIFO (First-In First-Out) method and wirelessly transmitted by the RF unit 43. The detected data wirelessly transmitted by the RF unit 43 is deleted from the memory 42.

The data amount to be transmitted at one time of the wireless transmitting operation, which is stored in the memory 42, can be changed by the CPU 41 or an external input. Generally, the power consumption amount W required for the wireless transmitting operation of data is proportional to the data amount to be wirelessly transmitted. For example, in the case where the power consumption amount W of the wireless transmitting unit 4 required for wirelessly transmitting 200 bytes of the data is about 200 µJ, the power consumption amount W required for wirelessly transmitting 400 bytes of the data is about 400 µJ. Thus, the wireless transmitting unit 4 can set the power consumption amount W consumed at one time of the wireless transmitting operation to be an arbitrary value by changing the data amount to be transmitted at one time of the wireless transmitting operation, which is stored in the memory 42.

The data table group stored in the memory 42 and shown in FIG. 11 is a data table group for associating the electromotive force $E_0$ of the power generating element 100 with the power consumption amount W and the power consumption timing. The data table group is data preliminary created based on performance of the wireless transmitting unit 4 and the capacitance C of the electric storage element 3. The data table group is stored in the memory 42 by a manufacture, a shipping person, a person in charge of attaching the wireless transmitting device 1 or the like at the time of manufacturing, shipping or attaching the wireless transmitting device 1.

The data table group shown in FIG. 11 is constituted of a plurality of data tables DT respectively corresponding to a plurality of values of the electromotive force $E_0$ of the power generating element 100. In FIG. 11, there are shown three data tables DT1 to DT3 respectively corresponding to the electromotive force $E_0=3$ (V), the electromotive force $E_0=3.5$ (V) and the electromotive force $E_0=4$ (V) in the case where the capacitance C of the electric storage element 3 is 500 (µF) (C=500 (µF)).

Each data table DT contains the data amount to be transmitted by the wireless transmitting unit 4, the power consumption amount W in the case of wirelessly transmitting this data amount of the detected data to the external device with the RF unit 43 and a plurality of data sets DS each constituted of the trigger voltage $E_1$ and a voltage $E_2$ of the electric storage element 3 after the electric power is supplied from the electric storage element 3 to the wireless transmitting unit 4 and consumed by the wireless transmitting unit 4. In this regard, in each data set DS, the power consumption amount W and the trigger voltage $E_1$ are set so as to achieve an income and outgo balance of energy between a power amount $W_{in}$ supplied from the power generating element 100 to the electric storage element 3 during the charging mode and the power consumption amount W consumed by the wireless transmitting unit 4 at one time of the wireless transmitting operation (that is, to satisfy a condition of "$W_{in}$=W").

The wireless transmitting unit 4 refers to the data table group stored in the memory 42 to select any one of the data sets DS from the data table DT corresponding to an estimated value of the electromotive force $E_0$ of the power generating element 100. After that, the wireless transmitting unit 4 stores the data amount to be transmitted of the selected data set DS in the memory 42 as the data amount to be transmitted at one time of the wireless transmitting operation and transmits a signal for setting the trigger voltage $E_1$ of the selected data set DS to the voltage detecting unit 6. With this operation, the wireless transmitting device 1 can arbitrarily set the power consumption amount W and the power consumption timing.

When the electric power is supplied to the wireless transmitting unit 4 in the power consumption mode, the wireless transmitting unit 4 consumes the electric power stored in the electric storage element 3 to read the detected data from the memory 42 and wirelessly transmit the detected data to the external device with the RF unit 43 based on the data amount to be transmitted at one time of the wireless transmitting operation, which is stored in the memory 42. After the wireless transmitting unit 4 wirelessly transmits the detected data to the external device, the wireless transmitting unit 4 transmits a power consumption end signal to the switching unit 5a.

The RF unit 43 is not particularly limited to a specific kind as long as it can wirelessly transmit the detected data to the external device. For example, it is possible to use a power-saving wireless communication IC meeting a Bluetooth (registered trade mark) standard, a wireless USB standard or ZigBee standard and the like as the RF unit 43.

The switching unit 5a is connected between the electric storage element 3 and the wireless transmitting unit 4 and has a function of switching between the charging mode for storing the electric power rectified by the rectifier 2 in the electric storage element 3 and the power consumption mode for supplying the electric power from the electric storage element 3 to the wireless transmitting unit 4 and consuming the electric power with the wireless transmitting unit 4. For example, it is possible to use a semiconductor switching element such as a MOSFET or a mechanical switch as the switching unit 5a. The switching unit 5a is a normally-open (NO) type switch. When the switching unit 5a receives the power consumption start signal from the voltage detecting unit 6, the switching unit 5a connects the electric storage element 3 and the wireless transmitting unit 4. When the switching unit 5a receives the power consumption end signal from the wireless transmitting unit 4, the switching unit 5a disconnects the electric storage element 3 and the wireless transmitting unit 4.

In the charging mode, the electric power supplied from the power generating element 100 is rectified by the rectifier 2 and then stored in the electric storage element 3. On the other hand, in the power consumption mode, the electric power stored in the electric storage element 3 is supplied to the wireless transmitting unit 4 and consumed by the wireless transmitting unit 4. When the switching unit 5a receives the power consumption end signal from the wireless transmitting unit 4 after the wireless transmitting unit 4 performs the wireless transmitting operation and the electric power is consumed, the switching unit 5a switches the mode from the power consumption mode to the charging mode.

The voltage detecting unit 6 is connected between the electric storage element 3 and the switching unit 5a in parallel with the electric storage element 3 and has a function of detecting the voltage E of the electric storage element 3 and transmitting the power consumption start signal to the switching unit 5a when the detected voltage E exceeds the trigger voltage $E_1$. Further, the voltage detecting unit 6 can transmit a signal for reporting a value of the detected voltage E of the electric storage element 3 to the wireless transmitting unit 4.

The voltage detecting unit 6 is not particularly limited to a specific kind as long as it can detect the voltage E of the electric storage element 3 and transmit the signal to the switching unit 5a and the wireless transmitting unit 4. For example, it is possible to use an element such as a voltage divider, a voltage transformer and a photoelectric field sensor utilizing the Pockels effect as the voltage detecting unit 6.

The trigger voltage $E_1$ for transmitting the power consumption start signal to the switching unit 5a is set according to the signal transmitted from the wireless transmitting unit 4. When the voltage E of the electric storage element 3 exceeds the trigger voltage $E_1$, the voltage detecting unit 6 transmits the power consumption start signal to the switching unit 5a. As described above, when the switching unit 5a receives the power consumption start signal from the voltage detecting unit 6, the switching unit 5a switches the mode from the charging mode to the power consumption mode. Further, when the electric power is consumed by the wireless transmitting unit 4 in the power consumption mode and then the switching unit 5a receives the power consumption end signal, the switching unit 5a switches the mode from the power consumption mode to the charging mode. At this time, the voltage E of the electric storage element 3 decreases to a value equal to or less than the trigger voltage $E_1$ due to the power consumption of the wireless transmitting unit 4. After that, the storage of the electric power into the electric storage element 3 is re-started.

As described above, the voltage detecting unit 6 transmits the power consumption start signal to the switching unit 5a every time when the voltage E of the electric storage element 3 exceeds the trigger voltage $E_1$. Thus, the wireless transmitting unit 4 can arbitrarily set the power consumption timing by changing the trigger voltage $E_1$.

Next, description will be given to the operations of the wireless transmitting device 1, in particular to a process for estimating the electromotive force $E_0$ of the power generating element 100 and a process for setting the power consumption amount W and the power consumption timing according to the electromotive force $E_0$ of the power generating element 100 with reference to FIGS. 12 to 16.

Figure 13:
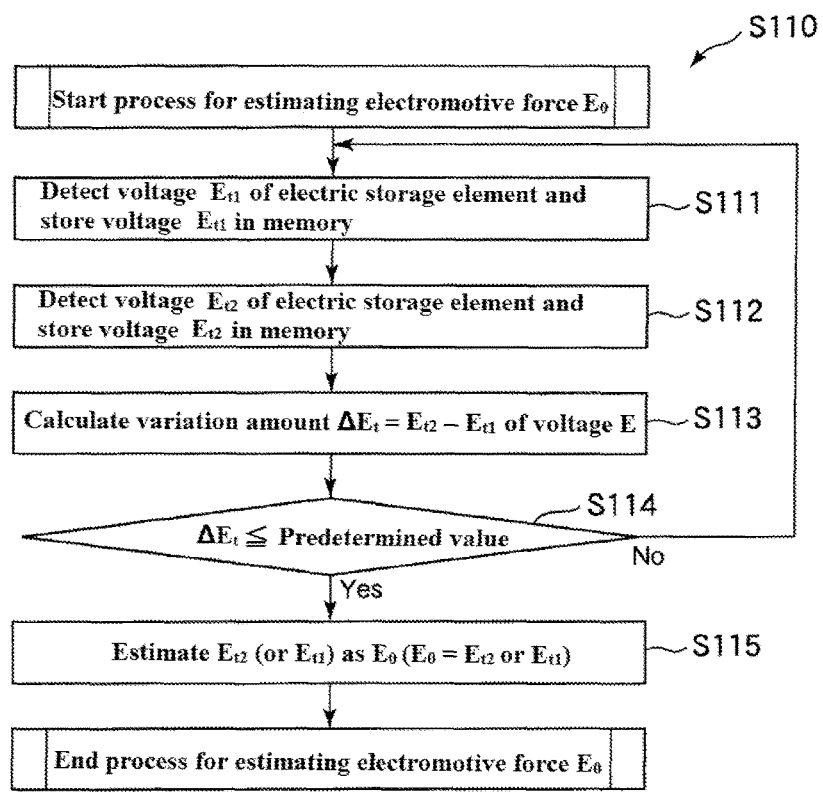
FIG. 13 is a flowchart showing a process for estimating the electromotive force $E_0$ shown in FIG. 12.
Figure 14:
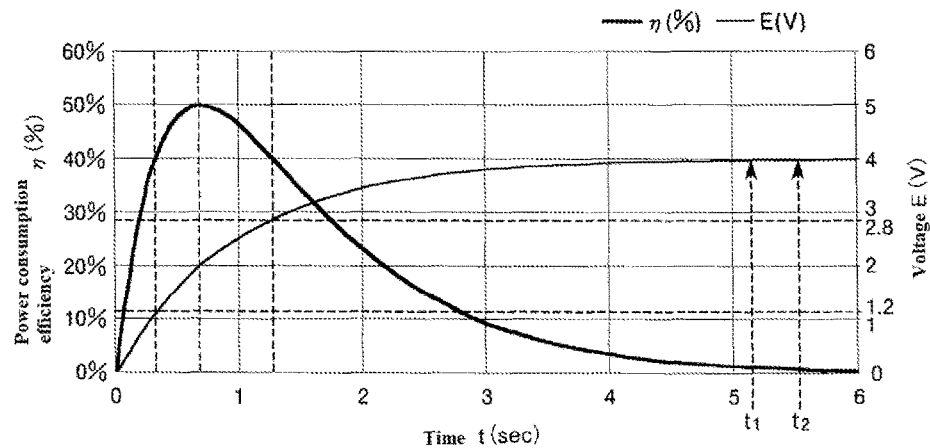
FIG. 14 is a graph showing time variations of the voltage E of the electric storage element shown in FIG. 7 and the power consumption efficiency η.
Figure 15:
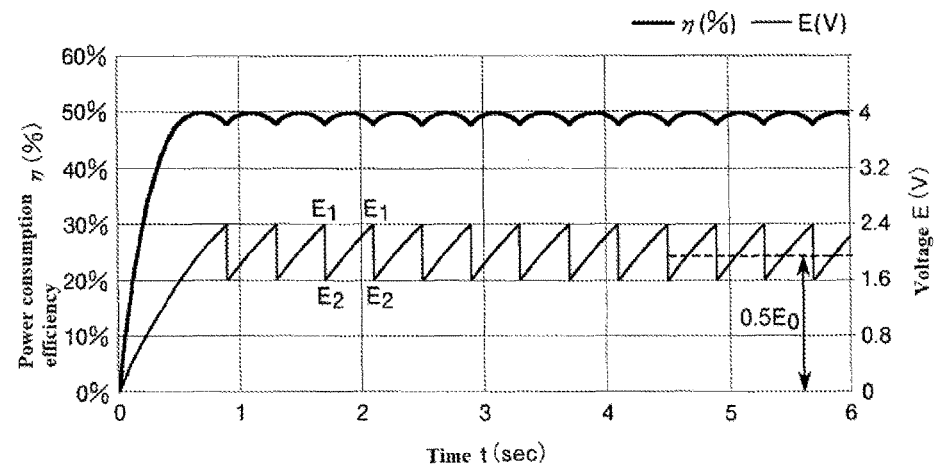
FIG. 15 is a graph showing the voltage E of the electric storage element and the power consumption efficiency η after the power consumption amount W and the power consumption timing are set.
Figure 16:
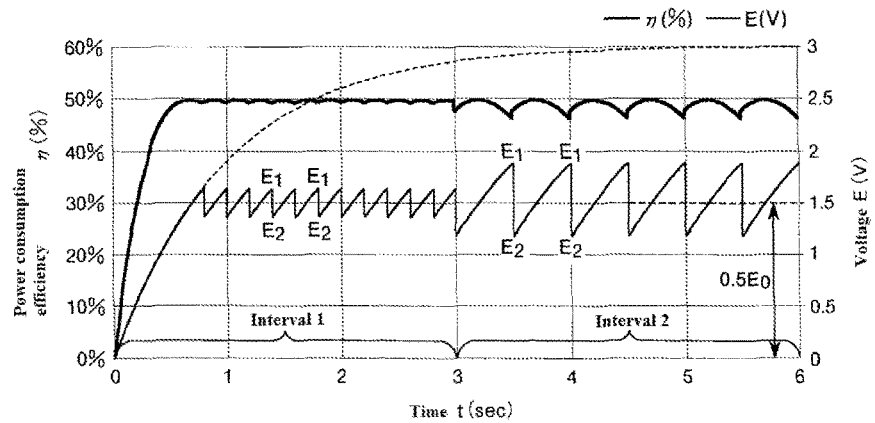
FIG. 16 is a graph showing the voltage E of the electric storage element and the power consumption efficiency η in the case of re-setting the power consumption amount W and the power consumption timing during operations of the wireless transmitting device.

FIG. 12 is a flowchart showing a process for setting the power consumption amount W and the power consumption timing. This process is performed by the wireless transmitting device 1 shown in FIG. 7. FIG. 13 is a flowchart showing the process for estimating the electromotive force $E_0$ shown in FIG. 12. FIG. 14 is a graph showing time variations of the voltage E of the electric storage element 3 shown in FIG. 7 and the power consumption efficiency η. FIG. 15 is a graph showing the voltage E of the electric storage element 3 and the power consumption efficiency η after the power consumption amount W and the power consumption timing are set. FIG. 16 is a graph showing the voltage E of the electric storage element 3 and the power consumption efficiency η in the case of re-setting the power consumption amount W and the power consumption timing during the operations of the wireless transmitting device 1.

A process S100 for setting the power consumption amount W and the power consumption timing shown in FIG. 12 contains a process S110 for estimating the electromotive force $E_0$ of the power generating element 100 and a process S120 for setting the power consumption amount W and the power consumption timing (that is the trigger voltage $E_1$) of the wireless transmitting unit 4.

When the electric power is supplied from the power generating element 100 to the wireless transmitting device 1, the process S100 starts. The process S100 for setting the power consumption amount W and the power consumption timing is performed when the mode is the charging mode. Further, the process S100 may be performed periodically (for example, every day or every month) in addition to at the time when the power generating element 100 starts to supply the electric power to the wireless transmitting device 1.

In the process S110, the electromotive force $E_0$ of the power generating element 100 is estimated. FIG. 13 shows the process S110 for estimating the electromotive force $E_0$ of the power generating element 100. Further, FIG. 14 shows a basic concept for a method of estimating the electromotive force $E_0$ of the power generating element 100.

FIG. 14 shows time variations of the voltage E of the electric storage element 3 and the power consumption efficiency η in the case where the electromotive force $E_0$ of the power generating element 100 is 4 (V). As shown in FIG. 14, at the time when time t is equal to 0 (s) (t=0 (s)), the voltage E is equal to 0 (V) (E=0(V)). This indicates that the electric power is not stored in the electric storage element 3. On the other hand, when the time t sufficiently increases (t=$t_1$ or $t_2$), the voltage E becomes approximately equal to the electromotive force $E_0$=(V) (E≈$E_0$=4 (V)) and the electric storage element 3 becomes in a saturated state. Hereinafter, the voltage E at the time when the electric storage element 3 is in the saturated state is referred to as "saturation voltage". When the electric storage element 3 becomes in the saturated state, the electric power is not stored in the electric storage element 3 anymore. Further, the power consumption efficiency η reaches a maximum value 50% at the time when the voltage E is equal to $E_0/2$=2 (V) (E=$E_0$/2=2 (V)). When the voltage E satisfies a condition of "$0.3E_0 \leq E < 0.7E_0$" (1.2 (V)≤E≤2.8 (V)), the power consumption efficiency η is equal to or larger than about 40%. In this embodiment, the electromotive force $E_0$ of the power generating element 100 is estimated based on the saturation voltage of the electric storage element 3.

At a step S111 shown in FIG. 13, a voltage $E_{t1}$ of the electric storage element 3 is detected by the voltage detecting unit 6 at an arbitrary timing and a detected value of the voltage $E_{t1}$ is stored in the memory 42. Next, at a step S112, a voltage $E_{t2}$ of the electric storage element 3 is detected by the voltage detecting unit 6 after a predetermined time passes and a detected value of the voltage $E_{t2}$ is stored in the memory 42. Next, at a step S113, the wireless transmitting unit 4 calculates "$\Delta E_t = E_{t2} - E_{t1}$". At a step S114, the wireless transmitting unit 4 determines whether or not $\Delta E_t$ is equal to or less than a predetermined value. In the case of determining that $\Delta E_t$ is larger than the predetermined value at the step S114, the process S110 returns to the step S111. On the other hand, in the case of determining that $\Delta E_t$ is equal to or less than the predetermined value at the step S114, that is in the case where the voltage E of the electric storage element 3 does not vary even if the electric power is stored (charged) in the electric storage element 3 for a predetermined time duration, it is judged that the voltage E of the electric storage element 3 reaches the saturation voltage. In this case, the process S110 shifts to a step S115. At the step S115, the electromotive force $E_0$ of the power generating element 100 is estimated as the saturation voltage of the electric storage element 3, that is the voltage $E_{t2}$ (or $E_{t1}$) and then the process S110 ends.

In this regard, although the predetermined value used for determining whether or not the voltage E of the electric storage element 3 reaches the saturation voltage can be arbitrarily set, the predetermined value is set so as to be larger than a resolution performance of the voltage detecting unit 6. Further, the predetermined value is preferably set to be equal to or less than 1% of the detected voltage $Et_2$ (or $Et_1$) and more preferably set to be equal to or less than 0.1% of the detected voltage $Et_2$ (or $Et_1$).

Referring back to FIG. 12, when the electromotive force $E_0$ of the power generating element 100 is estimated at the process S110, the process S100 shifts to a process S120 for setting the power consumption amount W and the power consumption timing (that is the trigger voltage $E_1$) of the wireless transmitting unit 4 according to the estimated electromotive force $E_0$ of the power generating element 100.

At the process S120, the power consumption amount W and the power consumption timing of the wireless transmitting unit 4 are set by selecting any one of the data sets DS of the data table DT corresponding to the estimated electromotive force $E_0$ of the power generating element 100 and setting the data amount to be transmitted at one time of the wireless transmitting operation and the trigger voltage $E_1$.

In this regard, in each data table DT shown in FIG. 11, the trigger voltage $E_1$ and the voltage $E_2$ are set so that an average value "($E_1+E_2$)/2" of the trigger voltage $E_1$ and the voltage $E_2$ becomes in the vicinity of $E_0/2$ (($E_1+E_2$)/2≈$E_0$/2). More specifically, the trigger voltage $E_1$ and the voltage $E_2$ are preferably set so as to satisfy a condition of "$0.3E_0 \leq (E_1+E_2)/2 \leq 0.7E_0$", more preferably set so as to satisfy a condition of "$0.4E_0 \leq (E_1+E_2)/2 \approx 0.6E_0$", and most preferably set so as to satisfy a condition of "($E_1+E_2$)/2=$E_0$/2". With this configuration, it is possible to operate the wireless transmitting device 1 with always keeping the power consumption efficiency η high.

Further, when the wireless transmitting unit 4 selects any one of the data sets DS from the data table DT corresponding to the electromotive force $E_0$ of the power generating element 100, it is preferable that the wireless transmitting unit 4 selects any one of the data sets DS so that the trigger voltage $E_1$ in the selected data set DS satisfies a condition of "$0.5E_0 < E_1 \leq 0.7E_0$" and the voltage $E_2$ in the selected data set DS satisfies a condition of "$0.3E_0 \leq E_2 < 0.5E_0$". By selecting any one of the data sets DS as described above, it is possible to operate the wireless transmitting device 1 with always keeping the power consumption efficiency η equal to or larger than about 40%.

Further, in addition to the above conditions, the wireless transmitting unit 4 may refer to information such as a minimum operating voltage of the wireless transmitting unit 4 and a power amount which is not directly consumed for the data transmission and consumed at the time of activating the wireless transmitting device 1 (for example, electric power which is stored in the CPU 41 and the like and discarded after the wireless transmitting device 1 is turned off or a power amount required for initializing the CPU 41) to select any one of the data sets DS from the data table DT corresponding to the electromotive force $E_0$ of the power generating element 100 and set the data amount to be transmitted at one time of the wireless transmitting operation and the trigger voltage $E_1$.

After the power consumption amount W and the power consumption timing (that is the trigger voltage $E_1$) are set according to the estimated electromotive force $E_0$ of the power generating element 100, the process S120 ends. Referring back to FIG. 12, when the process S120 ends, the process S100 ends.

FIG. 15 shows the power consumption efficiency η of the wireless transmitting device 1 and the voltage E of the electric storage element 3 after setting the power consumption amount W and the power consumption timing according to the above-described method. In an example shown in FIG. 15, the power consumption amount W and the power consumption timing are set by selecting any one of the data sets DS so that the conditions of "$(E_1+E_2)/2=E_0/2=2$ (V)", "$E_1=0.6E_0=2.4$ (V)" and "$E_2=0.4E_0=1.6$ (V)".

As is clear from FIG. 15, by setting the power consumption amount W and the power consumption timing according to the electromotive force $E_0$ of the power generating element 100, it is possible to always keep the power consumption efficiency η a very high value equal to or larger than about 48% after the wireless transmitting device 1 starts the wireless transmitting operation. Thus, the wireless transmitting device 1 of the present invention can operate with the high power consumption efficiency, thereby performing the wireless transmission of the detected data with a high average transmitting rate.

Further, the wireless transmitting device 1 may perform the process S100 for setting the power consumption amount W and the power consumption timing at an arbitrary timing or periodically in addition to at the time when the power generating element 100 starts to supply the electric power to the wireless transmitting device 1.

FIG. 16 shows an example of the power consumption efficiency η of the wireless transmitting device 1 in the case where the electromotive force $E_0$ is 3 (V) ($E_0=3$ (V)) and the capacitance C of the electric storage element 3 is 500 (μF) (C=500 (μF)). In an interval 1 in the range of the time t=1 to 3 (s) in FIG. 16, the power consumption amount W and the power consumption timing are set so that the power consumption amount W is equal to 200 (μJ) (W=200 (μJ)), the trigger voltage $E_1$ is equal to 1.65 (V) ($E_1=1.65$ (V)) and the average value "$(E_1+E_2)/2$" is equal to "$E_0/2=1.5$ (V)" ($(E_1+E_2)/2=E_0/2=1.5$ (V)). On the other hand, in an interval 2 in the range of the time t=3 to 6 (s), the power consumption amount W and the power consumption timing are set so that the power consumption amount W is equal to 500 (μJ) (W=500 (μJ)), the trigger voltage $E_1$ is equal to 1.89 (V) ($E_1=1.89$ (V)) and the average value "$(E_1+E_2)/2$" is equal to "$E_0/2=1.5$ (V)" ($(E_1+E_2)/2=E_0/2=1.5$ (V)).

As described above, by setting the power consumption amount W and the power consumption timing at an arbitrary timing or periodically during the wireless transmitting operations of the wireless transmitting device 1, it is possible to appropriately re-set (change) the power consumption amount W and the power consumption timing according to a remaining amount of the data to be transmitted. Further, even in the case where the electromotive force $E_0$ of the power generating element 100 varies during the wireless transmitting operations of the wireless transmitting device 1, it is possible to set the power consumption amount W and the power consumption timing in response to the variation of the electromotive force $E_0$.

Second Embodiment

Figure 17:
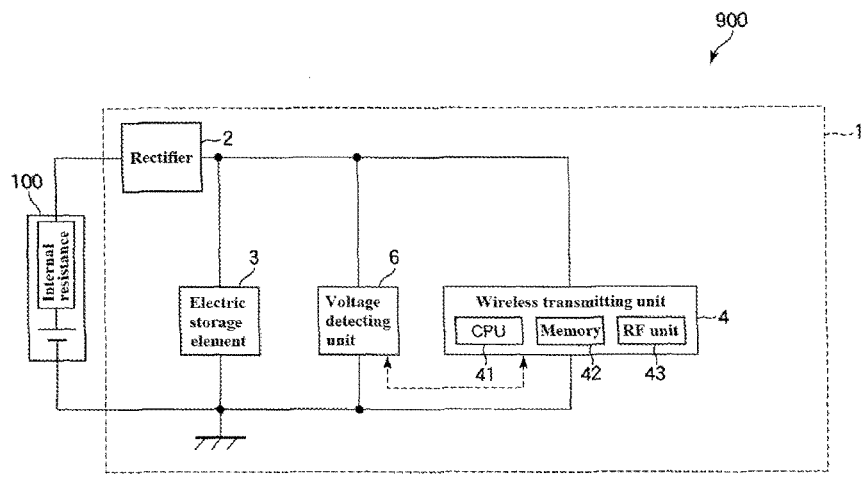
FIG. 17 is a view showing a wireless transmitting device and a wireless transmitting system according to a second embodiment of the present invention.

Next, description will be given to a wireless transmitting device and a wireless transmitting system according to a second embodiment of the present invention. FIG. 17 is a view showing the wireless transmitting device and the wireless transmitting system according to the second embodiment of the present invention.

Hereinafter, the wireless transmitting device and the wireless transmitting system of the second embodiment will be described by placing emphasis on the points differing from the wireless transmitting device and the wireless transmitting system of the first embodiment, with the same matters being omitted from description.

A wireless transmitting device 1 and a wireless transmitting system 900 of the second embodiment respectively have the same configurations as the wireless transmitting device 1 and the wireless transmitting system 900 of the first embodiment except that the switching unit 5a is omitted from the wireless transmitting device 1 and the process for setting the power consumption amount W and the power consumption timing of the wireless transmitting unit 4 in the process S120 is changed.

The wireless transmitting unit 4 of this embodiment has the function of the switching unit 5a of the first embodiment, that is the function of switching between the charging mode (this mode is sometimes referred to as "sleep mode") for storing the electric power rectified by the rectifier 2 in the electric storage element 3 and the power consumption mode for supplying the electric power from the electric storage element 3 to the wireless transmitting unit 4 and consuming the electric power with the wireless transmitting unit 4.

Further, although the wireless transmitting unit 4 of the first embodiment arbitrarily sets the power consumption amount W with using the data amount to be transmitted which is contained in the data set DS of the data table group stored in the memory 42, the wireless transmitting unit 4 of this embodiment arbitrarily sets the power consumption amount W with using the trigger voltage $E_1$ and the voltage $E_2$ which are contained in the data set DS of the data table group stored in the memory 42.

Namely, the voltage detecting unit 6 of this embodiment is configured to transmit the power consumption start signal to the wireless transmitting unit 4 when the voltage detecting unit 6 detects that the voltage E of the electric storage element 3 exceeds the trigger voltage $E_1$. Further, the voltage detecting unit 6 of this embodiment is configured to transmit the power consumption end signal to the wireless transmitting unit 4 when the voltage detecting unit 6 detects that the voltage E of the electric storage element 3 decreases to a value less than the voltage $E_2$ due to the power consumption of the wireless transmitting unit 4. Furthermore, the trigger voltage $E_1$ and the voltage $E_2$ used for transmitting the signals to the wireless transmitting unit 4 are set according to signals received from the wireless transmitting unit 4.

When the voltage detecting unit 6 detects that the voltage E of the electric storage element 3 exceeds the trigger voltage $E_1$, the voltage detecting unit 6 transmits the power consumption start signal to the wireless transmitting unit 4 as is the case with the first embodiment. When the wireless transmitting unit 4 receives the power consumption start signal from the voltage detecting unit 6, the wireless transmitting unit 4 switches the mode from the charging mode to the power consumption mode. When the mode is switched to the power consumption mode, the wireless transmitting unit 4 consumes the electric power supplied from the electric storage element 3 to start the wireless transmitting operation of the detected data. At this time, the wireless transmitting unit 4 of this embodiment does not set the data amount of the detected data to be wirelessly transmitted and keeps performing the wireless transmitting operation of the detected data until the wireless transmitting unit 4 receives the power consumption end signal from the voltage detecting unit 6.

While the wireless transmitting unit 4 keeps performing the wireless transmitting operation of the detected data, the electric power stored in the electric storage element 3 is continuously consumed by the wireless transmitting operation of the wireless transmitting unit 4 and the voltage E of the electric storage element 3 gradually decreases. When the voltage detecting unit 6 detects that the voltage E of the electric storage element 3 decreases to a value less than the voltage $E_2$ due to the power consumption of the wireless transmitting unit 4, the voltage detecting unit 6 transmits the power consumption end signal to the wireless transmitting unit 4. When the wireless transmitting unit 4 receives the power consumption end signal from the voltage detecting unit 6, the wireless transmitting unit 4 switches the mode from the power consumption mode to the charging mode. After that, the storage of the electric power into the electric storage element 3 is restarted.

As described above, the voltage detecting unit 6 transmits the power consumption start signal to the wireless transmitting unit 4 every time when the voltage E of the electric storage element 3 exceeds the trigger voltage $E_1$ and transmits the power consumption end signal to the wireless transmitting unit 4 every time when the voltage E of the electric storage element 3 decreases to the value less than the voltage $E_2$. The power consumption amount W consumed at one time of the wireless transmitting operation of the wireless transmitting unit 4 depends on an time interval from the power consumption start signal to the power consumption end signal. Thus, the wireless transmitting unit 4 of this embodiment can arbitrarily set the power consumption amount W by changing the trigger voltage $E_1$ and the voltage $E_2$.

Namely, in this embodiment, the wireless transmitting unit 4 can set the power consumption amount W and the power consumption timing according to the electromotive force $E_0$ of the power generating element 100 by changing the trigger voltage $E_1$ and the voltage $E_2$ according to the electromotive force $E_0$ of the power generating element 100.

As described above, in this embodiment, it is possible to set the power consumption amount W and the power consumption timing according to the electromotive force $E_0$ of the power generating element 100 without using the switching unit, thereby simplifying the configuration of the wireless transmitting device 1. Further, since the switching unit is not used in this embodiment, it is possible to prevent the wireless transmitting device 1 from be broken down due to fatigue breakdown, a bad connection, aging deterioration and the like of the switching unit. The wireless transmitting device 1 is often used in a state that the wireless transmitting device 1 is attached to the vibrating body together with the power generating element 100. Further, each component of the wireless transmitting device 1, in particular the switching device is likely to be broken down by the vibration. Thus, the effect for preventing the breakdown of the wireless transmitting device 1 caused by the fatigue breakdown, the bad connection, the aging deterioration and the like of the switching unit is especially useful.

The wireless transmitting device 1 and the wireless transmitting system 900 of the second embodiment described above can provide the same functions and effects as the wireless transmitting device 1 and the wireless transmitting system 900 of the first embodiment.

Third Embodiment

Next, description will be given to a wireless transmitting device and a wireless transmitting system according to a third embodiment of the present invention.

Figure 18:
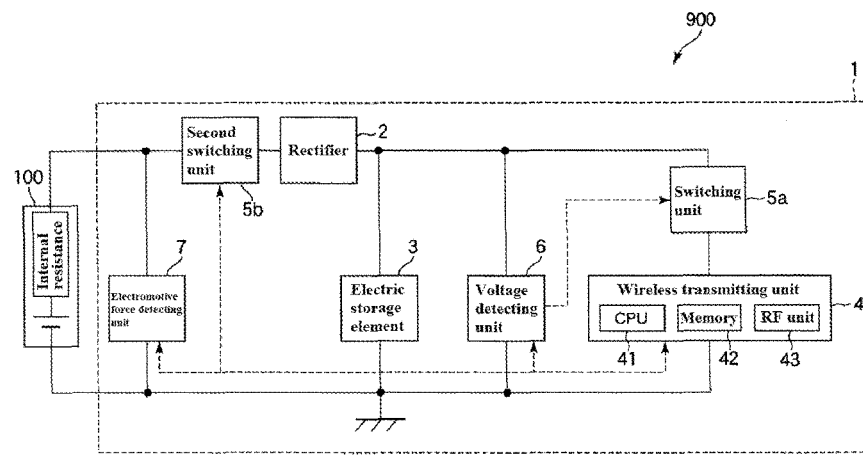
FIG. 18 is a view showing a wireless transmitting device and a wireless transmitting system according to a third embodiment of the present invention.
Figure 19:
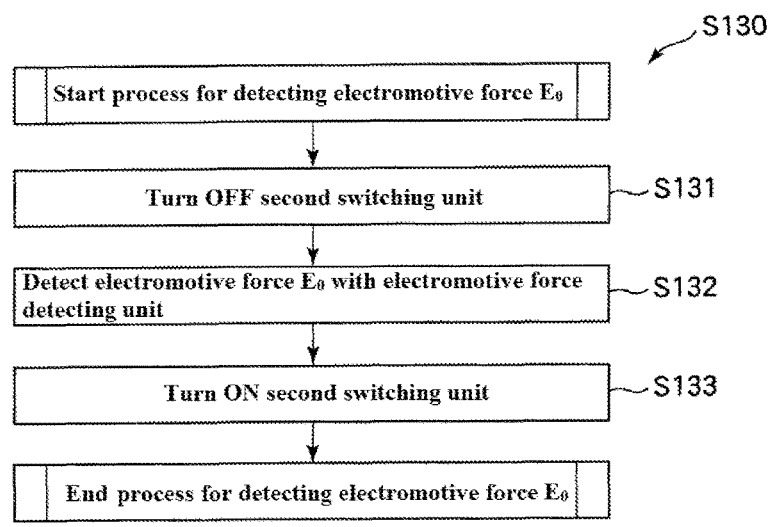
FIG. 19 is a flowchart showing a process for detecting the electromotive force $E_O$ performed by the wireless transmitting device and the wireless transmitting system shown in FIG. 18.

FIG. 18 is a view showing the wireless transmitting device and the wireless transmitting system according to the third embodiment of the present invention. FIG. 19 is a flowchart showing a process for detecting the electromotive force $E_0$ performed by the wireless transmitting device and the wireless transmitting system shown in FIG. 18.

Hereinafter, the wireless transmitting device and the wireless transmitting system of the third embodiment will be described by placing emphasis on the points differing from the wireless transmitting device and the wireless transmitting system of the first embodiment, with the same matters being omitted from description.

A wireless transmitting device 1 and a wireless transmitting system 900 of the third embodiment respectively have the same configurations as the wireless transmitting device 1 and the wireless transmitting system 900 of the first embodiment except that the wireless transmitting device 1 includes a second switching unit 5b and an electromotive force detecting unit 7 and the electromotive force $E_0$ of the power generating element 100 is directly detected by the electromotive force detecting unit 7.

The second switching unit 5b is connected between the power generating element 100 and the rectifier 2 and has a function of switching between the described charging mode and an opening mode for disconnecting the connection between the power generating element 100 and the electric storage element 3 to allow the power generating element 100 to be in an opened mode. Further, the second switching unit 5b is communicatively connected to at least the wireless transmitting unit 4 and the electromotive force detecting unit 7 and can perform a switching operation based on a signal received from the wireless transmitting unit 4 or the electromotive force detecting unit 7.

Although it is possible to use the same switching element as the described switching unit 5a and the like as the second switching unit 5b, the second switching unit 5b is a normally-close (NC) type switch. When the second switching unit 5b receives the signal from the wireless transmitting unit 4, the second switching unit 5b disconnects the connection between the power generating element 100 and the electric storage element 3 to allow the power generating element 100 to be in the opened state. On the other hand, when the second switching unit 5b receives the signal from the electromotive force detecting unit 7, the second switching unit 5b connects between the power generating element 100 and the electric storage element 3 to switch the mode from the opened mode to the charging mode.

The electromotive force detecting unit 7 is connected to the pair of electrode terminals 90 of the power generating element 100 and has a function of directly detecting the electromotive force $E_0$ of the power generating element 100 when the second switching unit 5b allows the power generating element 100 to be in the opened state. Further, the electromotive force detecting unit 7 is communicatively connected to at least the wireless transmitting unit 4 and the second switching unit 5b. The electromotive force detecting unit 7 transmits a directly-detected value of the electromotive force $E_0$ of the power generating element 100 to the wireless transmitting unit 4 and then transmits the signal to the second switching unit 5b.

As the electromotive force detecting unit 7, it is possible to use the same element as the described voltage detecting unit 6 and the like. The electromotive force detecting unit 7 detects a voltage of the power generating element 100 in the opened state and directly detects the electromotive force $E_0$ of the power generating element 100 based on amplitude of the detected voltage.

The wireless transmitting device 1 of the third embodiment performs a process S130 for detecting the electromotive force $E_0$ of the power generating element 100 shown in FIG. 19 instead of the described process S110 for estimating the electromotive force $E_0$ of the power generating element 100 performed by the wireless transmitting device 1 of the first embodiment.

At a step S131 after the process S130 starts, the wireless transmitting unit 4 transmits the signal to the second switching unit 5b at an arbitrary timing or periodically. When the second switching unit 5b receives the signal from the wireless transmitting unit 4, the second switching unit 5b switches the mode from the charging mode to the opening mode (namely, the second switching unit 5b is turned off). Next, at a step S132, the electromotive force detecting unit 7 detects the voltage of the power generating element 100 in the opened state to directly detect the electromotive force $E_0$ of the power generating element 100 and transmit the detected value of the electromotive force $E_0$ of the power generating element 100 to the wireless transmitting unit 4. After that, at a step S133, the electromotive force detecting unit 7 transmits the signal to the second switching unit 5b. When the second switching unit 5b receives the signal from the electromotive force detecting unit 7, the second switching unit 5b switches the mode from the opening mode to the charging mode (namely, the second switching unit 5b is turned on). After the step S133 ends, the process S130 for detecting the electromotive force $E_0$ of the power generating element 100 ends.

Since the electromotive force $E_0$ of the power generating element 100 is directly detected by using the second switching unit 5b and the electromotive force detecting unit 7 in this embodiment as described above, it is possible to more accurately get the value of the electromotive force $E_0$ of the power generating element 100 compared with the case of estimating the value of the electromotive force $E_0$ of the power generating element 100. Further, since it is unnecessary to detect the voltage E of the electric storage element 3 multiple times in this embodiment, it is possible to shorten the time required for obtaining the value of the electromotive force $E_0$.

The wireless transmitting device 1 and the wireless transmitting system 900 of the third embodiment described above can provide the same functions and effects as the wireless transmitting devices 1 and the wireless transmitting systems 900 of the first embodiment and the second embodiment.

Fourth Embodiment

Figure 20:
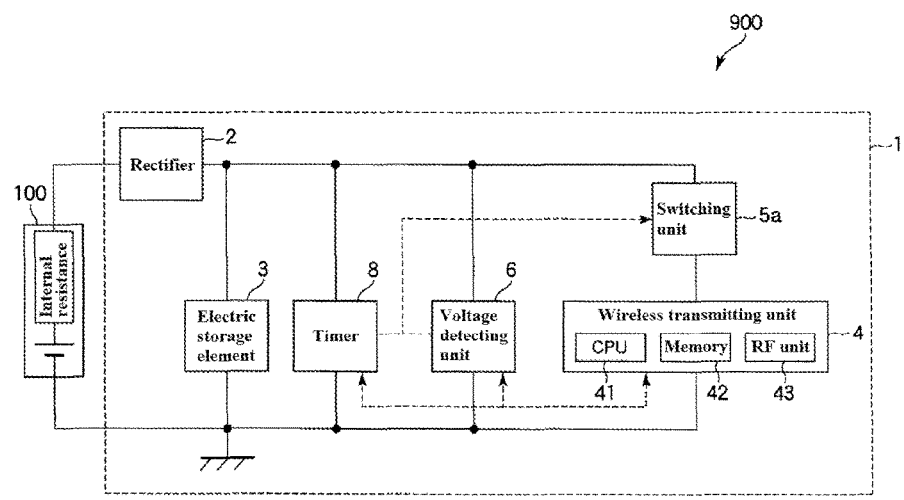
FIG. 20 is a view showing a wireless transmitting device and a wireless transmitting system according to a fourth embodiment of the present invention.

Next, description will be given to a wireless transmitting device and a wireless transmitting system according to a fourth embodiment of the present invention. FIG. 20 is a view showing the wireless transmitting device and the wireless transmitting system according to the fourth embodiment of the present invention.

A wireless transmitting device 1 and a wireless transmitting system 900 of the fourth embodiment respectively have the same configurations as the wireless transmitting device 1 and the wireless transmitting system 900 of the first embodiment except that the wireless transmitting device 1 includes a timer 8 and the method for estimating the electromotive force $E_0$ of the power generating element 100 and the process for setting the power consumption amount W and the power consumption timing are changed.

Hereinafter, the wireless transmitting device and the wireless transmitting system of the fourth embodiment will be described by placing emphasis on the points differing from the wireless transmitting device and the wireless transmitting system of the first embodiment, with the same matters being omitted from description.

The timer 8 is connected between the electric storage element 3 and the switching unit 5a in parallel with the electric storage element 3 and has a function of transmitting the power consumption start signal to the switching unit 5a when a predetermined time interval $\Delta t$ passes. Further, the timer 8 can measure a length of a time interval Td based on a measurement start signal and a measurement end signal received from the wireless transmitting unit 4 and transmit the measured length of the time interval Td to the wireless transmitting unit 4.

The timer 8 is communicatively connected to the wireless transmitting unit 4. Further, the time interval $\Delta t$ for transmitting the power consumption start signal to the switching unit 5a is set according to a signal received from the wireless transmitting unit 4. The timer 8 transmits the power consumption start signal to the switching unit 5a every time when the set time interval $\Delta t$ passes. When the switching unit 5a receives the power consumption start signal from the timer 8, the switching unit 5a switches the mode from the charging mode to the power consumption mode. Thus, in this embodiment, the power consumption timing depends on the time interval $\Delta t$ of the timer 8. Namely, in this embodiment, the wireless transmitting unit 4 can change the power consumption timing by changing the time interval $\Delta t$ of the timer 8.

The timer 8 is not particularly limited to a specific kind as long as it can count time and transmit the signal to the switching unit 5a and the wireless transmitting unit 4. For example, it is possible to use a CR oscillation circuit for counting time with a CR oscillation, an integration circuit for counting time with a capacitor and a resistance, a circuit utilizing a clock signal and the like as the timer 8. Although the timer 8 is connected in parallel with the electric storage element 3 and performs an operation with utilizing the electric power stored in the electric storage element 3, the present invention is not limited thereto. For example, the timer 8 itself may have another power source such as a battery or may receive electric power from an external power source.

Next, description will be given to the operation of the wireless transmitting device 1, the process for estimating the electromotive force $E_0$ of the power generating element 100 and the process for setting the power consumption amount W and the power consumption timing according to the electromotive force $E_0$ of the power generating element 100 of this embodiment with reference to FIGS. 21 to 24.

Figure 21:
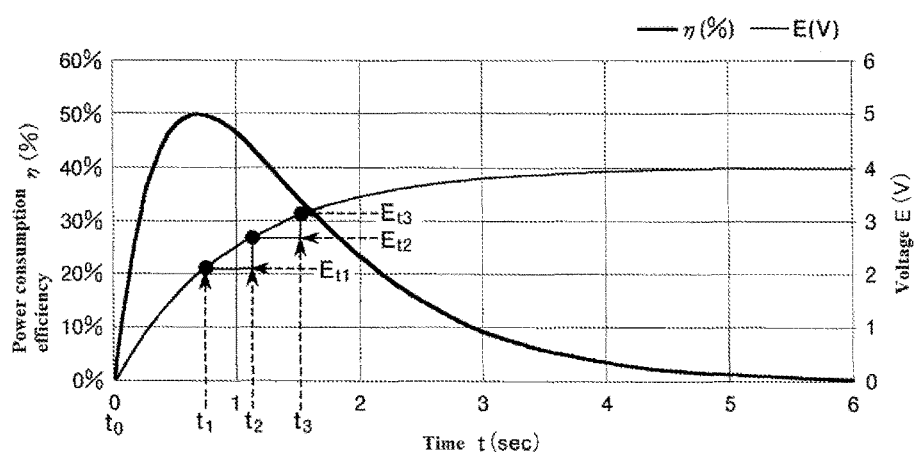
FIG. 21 is a graph showing time variations of the voltage E of the electric storage element shown in FIG. 20 and the power consumption efficiency η.
Figure 22:
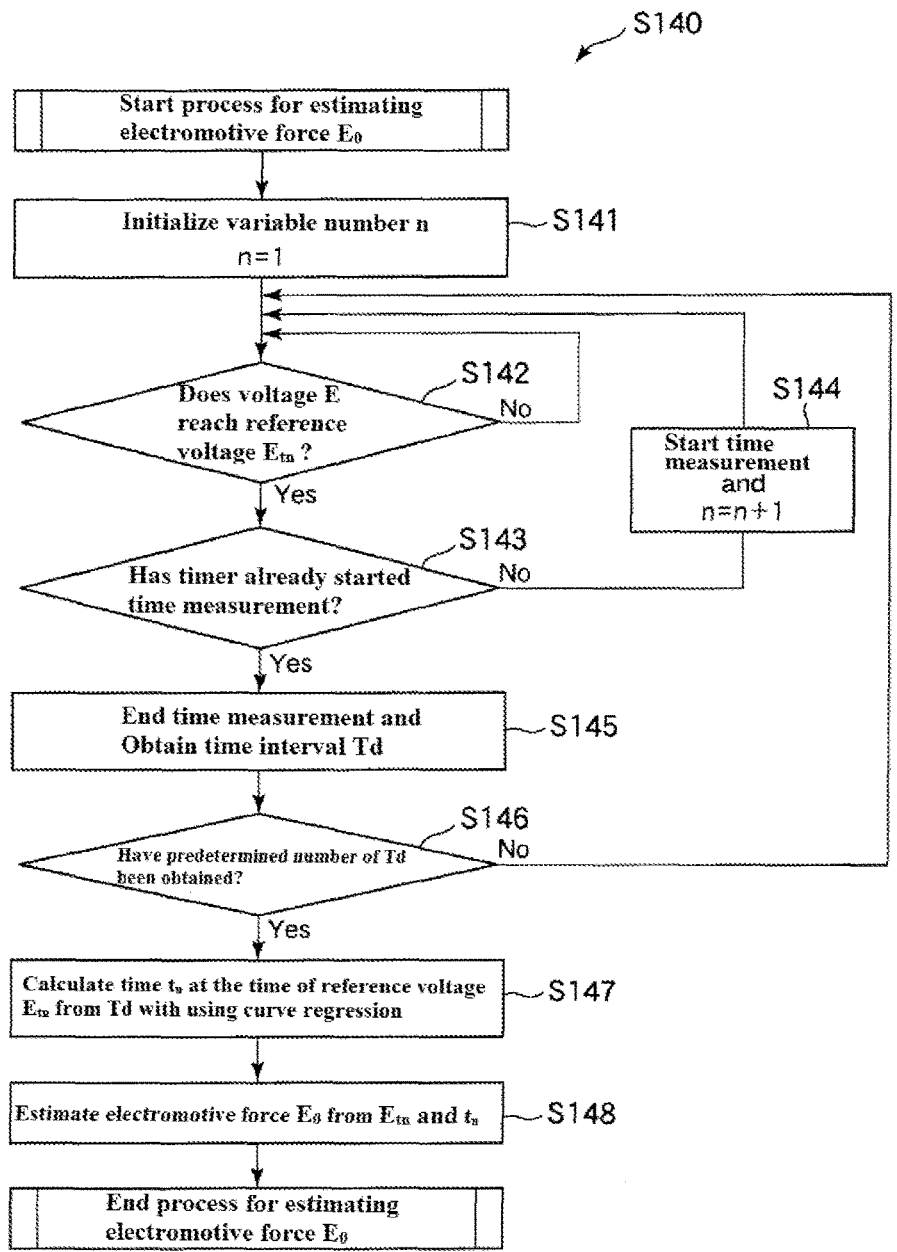
FIG. 22 is a flowchart showing a process for estimating the electromotive force $E_O$ performed by the wireless transmitting device and the wireless transmitting system shown in FIG. 20.
Figure 23:
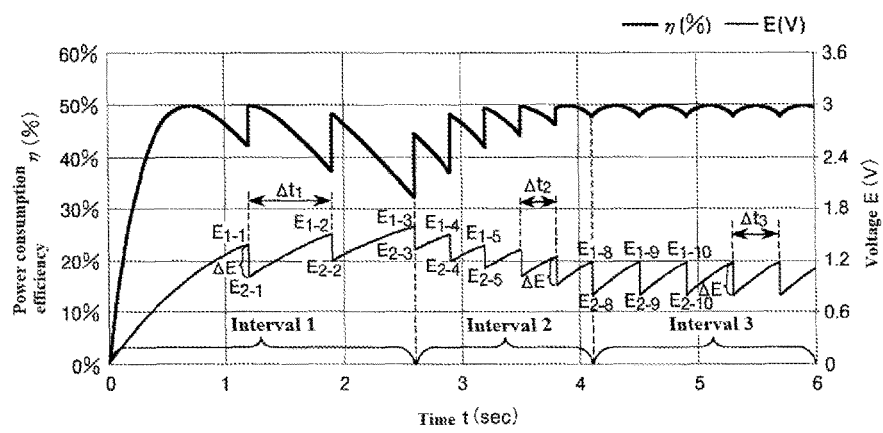
FIG. 23 is a graph for explaining a process for setting the power consumption amount W and the power consumption timing performed by the wireless transmitting device and the wireless transmitting system shown in FIG. 20.
Figure 24:
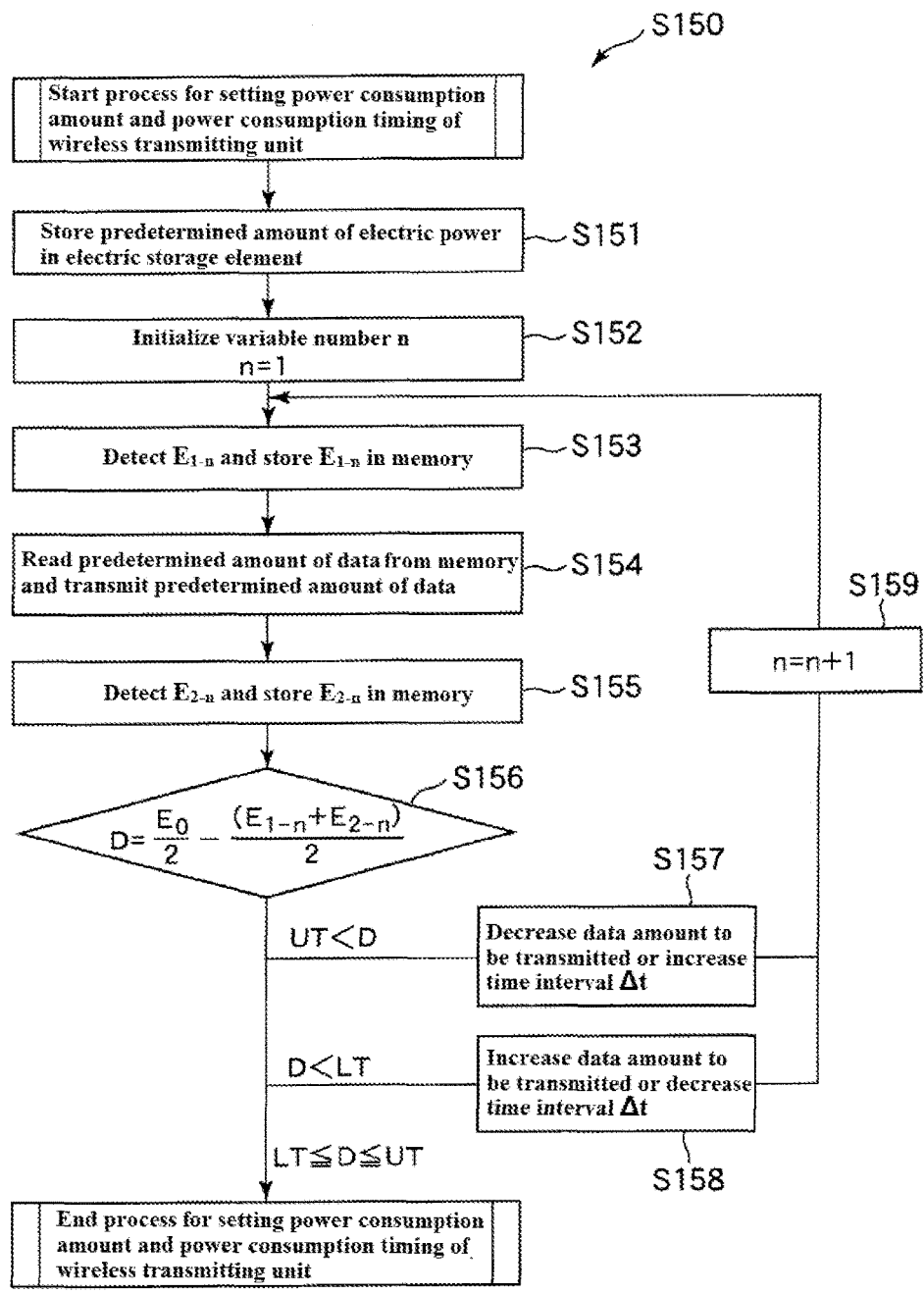
FIG. 24 is a flowchart showing the process for setting the power consumption amount W and the power consumption timing performed by the wireless transmitting device and the wireless transmitting system shown in FIG. 20.

FIG. 21 is a graph showing time variations of the voltage E of the electric storage element 3 shown in FIG. 20 and the power consumption efficiency $\eta$. FIG. 22 is a flowchart showing the process for estimating the electromotive force $E_O$ performed by the wireless transmitting device 1 and the wireless transmitting system 900 shown in FIG. 20. FIG. 23 is a graph for explaining the process for setting the power consumption amount W and the power consumption timing performed by the wireless transmitting device 1 and the wireless transmitting system 900 shown in FIG. 20. FIG. 24 is a flowchart showing the process for setting the power consumption amount W and the power consumption timing performed by the wireless transmitting device 1 and the wireless transmitting system 900 shown in FIG. 20.

The wireless transmitting device 1 of this embodiment performs a process S140 for estimating the electromotive force $E_O$ of the power generating element 100 by detecting the voltage E of the electric storage element 3 in a non-saturated state multiple times (for example, voltages $E_{t1}$ to $E_{t3}$ are detected in FIG. 21) instead of the process S110 performed by the wireless transmitting device 1 of the first embodiment.

FIG. 22 is a flowchart of the process S140 for estimating the electromotive force $E_O$ performed by the wireless transmitting device 1 of this embodiment. First, at a step S141, a variable number n is initialized (n=1). Next, at a step S142, the voltage E of the electric storage element 3 is detected by the voltage detecting unit 6 and it is determined whether or not the detected voltage E reaches a predetermined reference voltage $Et_n$. In the case of determining that the voltage E is less than the predetermined reference voltage $Et_n$ at the step S142, the step S142 is repeated until the voltage E reaches the predetermined reference voltage $Et_n$. On the other hand, in the case of determining that the voltage E reaches the predetermined reference voltage $Et_n$ at the step S142, the process shifts to a step S143.

At the step S143, it is determined whether or not the timer 8 has already received the measurement start signal from the wireless transmitting unit 4 to start a time measurement, that is whether or not a measurement for the time interval Td has been started. In the case of determining that the timer 8 does not start the time measurement at the step S143, the process shifts to a step S144. At the step S144, the timer 8 is reset and the measurement for the time interval Td is started. Further, at the step S144, the variable number n is incremented. After that, it is re-determined at the step S142 whether or not the voltage E reaches a subsequent reference voltage $E_{tn}$.

On the other hand, in the case of determining that the timer 8 has already started the time measurement at the step S143, the process shifts to a step S145. At the step S145, the time measurement of the timer 8 ends, the time interval Td is obtained and the value of the time interval Td is transmitted to the wireless transmitting unit 4. After that, at a step S146, it is determined whether or not the wireless transmitting unit 4 has been already obtained a predetermined number of the time intervals Td. In the case of determining that the wireless transmitting unit 4 does not obtain the predetermined number of the time intervals Td at the step S146, the process returns to the step S142 and the steps S142 to S146 are repeated until the wireless transmitting unit 4 obtains the predetermined number of the time intervals Td. In this regard, although the predetermined number of the time intervals Td to be obtained is not particularly limited to a specific number, the predetermined number of the time intervals Td is at least equal to or larger than two and it is preferable from a viewpoint of improving accuracy for a curve regression described later that the predetermined number of the time intervals Td is at least equal to or larger than three.

On the other hand, in the case of determining that the wireless transmitting unit 4 has already obtained the predetermined number of the time intervals Td at the step S146, the process shifts to a step S147. At the step S147, the wireless transmitting unit 4 calculates a time $t_n$ at the time when the voltage E reaches each reference voltage $E_{tn}$ (for example, a time $t_1$ at the time when the voltage E reaches a reference voltage $E_{t1}$) with using the curve regression such as a polynomial approximation based on the plurality of obtained time intervals Td, that is the time intervals Td required for increasing the voltage E of the electric storage element 3 by predetermined amounts. After that, at a step S148, the electromotive force $E_O$ of the power generating element 100 is estimated by respectively assigning "$E_{tn}$" and "$t_n$" to "E" and "t" in the following equation (2). In the following equation (2), "C" represents the capacitance of the electric storage element 3. When the electromotive force $E_O$ of the power generating element 100 is estimated, the process S140 for estimating the electromotive force $E_O$ of the power generating element 100 ends.

$$E = E_0\left(1 - e^{-\frac{t}{CR_0}}\right) \quad (2)$$

After the electromotive force $E_O$ of the power generating element 100 is estimated, the wireless transmitting device 1 of this embodiment performs a process S150 for setting the power consumption amount W and the power consumption timing (that is the time interval Δt) with using a feed-back process instead of the described process S120 performed by the wireless transmitting device 1 of the first embodiment.

FIG. 23 is a graph for showing a basic concept of the process S150 of this embodiment for setting the power consumption amount W and the power consumption timing. As described above, in this embodiment, the timer 8 transmits the signal to the switching unit 5a every time when the predetermined time interval Δt passes. When the switching unit 5a receives the signal from the timer 8, the switching unit 5a switches the mode from the charging mode to the power consumption mode.

Thus, the electric power is continuously stored in the electric storage element 3 during the predetermined time interval Δt and the power consumption amount W of the electric power is consumed by the wireless transmitting unit 4 after the predetermined time interval Δt passes. As a result, the voltage E of the electric storage element 3 decreases by "ΔE".

As is the case with the wireless transmitting device 1 of the first embodiment, the wireless transmitting device 1 of this embodiment also sets the power consumption amount W and the power consumption timing (the time interval Δt) so that when the voltage of the electric storage element 3 at the timing of supplying the electric power from the electric storage element 3 to the wireless transmitting unit 4 to consume the electric power is defined as "$E_1$" and the voltage of the electric storage element 3 after the electric power is consumed by the wireless transmitting unit 4 is defined as "$E_2$", "$(E_1+E_2)/2$" is in the vicinity of "$E_0/2$" ($(E_1+E_2)/2 \approx E_0/2$).

At this time, if the condition of the income and outgo balance of energy between the power amount $W_{in}$ supplied from the power generating element 100 to the electric storage element 3 during the charging mode and the power consumption amount W ($W_{in}$=W) is not satisfied, it is difficult to keep satisfying the condition that "$(E_1+E_2)/2$" is in the vicinity of "$E_0/2$" ($(E_1+E_2)/2 \approx E_0/2$).

For example, in an interval 1 in FIG. 23, since the power amount $W_{in}$ is larger than the power consumption amount W, the voltage $E_1$ increases every time when the charging and discharging operation is performed ($E_{1-1} < E_{1-2} < E_{1-3}$). In an interval 2 in FIG. 23, since the power amount $W_{in}$ is less than the power consumption amount W, the voltage $E_1$ increases every time when the charging and discharging operation is performed ($E_{1-3} > E_{1-4} > E_{1-5}$). In this case, it is difficult to keep satisfying the condition that "$(E_1+E_2)/2$" is in the vicinity of "$E_0/2$" ($(E_1+E_2)/2 \approx E_0/2$).

On the other hand, in an interval 3 in FIG. 23, since the condition of the income and outgo balance of energy between the power amount $W_{in}$ and the power consumption amount W ($W_{in}$=W) is satisfied, the voltage $E_1$ does not vary ($E_{1-8} = E_{1-9} = E_{1-10}$) even if the charging and discharging operation is repeated. In this case, it is easy to keep satisfying the condition that "$(E_1+E_2)/2$" is in the vicinity of "$E_0/2$" ($(E_1+E_2)/2 \approx E_0/2$).

The power amount $W_{in}$ can be controlled by changing the time interval Δt (the power consumption timing). For example, by increasing the time interval Δt, it is possible to increase the power amount $W_{in}$. In contrast, by decreasing the time interval Δt, it is possible to decrease the power amount $W_{in}$. On the other hand, as described above, the power consumption amount W can be controlled by changing the data amount to be transmitted at one time of the wireless transmitting operation.

The wireless transmitting device 1 of this embodiment sets the power consumption amount W and the power consumption timing (that is the time interval Δt) with using a feed-back process so that "$(E_1+E_2)/2$" becomes in the vicinity of "$E_0/2$" ($(E_1+E_2)/2 \approx E_0/2$) with taking the income and outgoing balance of the electric power described above.

FIG. 24 is a flowchart of a process S150 for setting the power consumption amount W and the power consumption timing performed by the wireless transmitting device 1 of this embodiment. In this regard, at the time of starting the process S150, the data amount to be transmitted at one time of the wireless transmitting operation and the time interval Δt stored in the memory 42 are respectively set to be arbitrary initial values.

After the electromotive force $E_0$ of the power generating element 100 is estimated at the process S140, the process S150 starts. In this regard, the process S150 may be performed not only after the electromotive force $E_0$ of the power generating element 100 is estimated at the process S140 but also at an arbitrary timing or periodically and may be performed every time when the wireless transmitting unit 4 performs the wireless transmitting operation.

At a step S151, a predetermined amount of the electric power is stored in the electric storage element 3. Although the predetermined amount at the step S151 is not particularly limited to a specific amount, the predetermined amount is set so as to be larger than at least a pre-assumed power consumption amount W. The determination as to whether or not the predetermined amount of the electric power is stored in the electric storage element 3 may be performed by detecting the voltage E of the electric storage element 3 with the voltage detecting unit 6 or by detecting that the electric power is supplied from the power generating element 100 to the electric storage element 3 for a predetermined time interval with the timer 8.

Next, at a step S152, the variable number n is initialized (n=1). Next, at a step S153, a voltage $E_{1-n}$ of the electric storage element 3 is detected by the voltage detecting unit 6 and a value of the voltage $E_{1-n}$ is stored in the memory 42. Next, at a step S154, the wireless transmitting unit 4 reads the predetermined amount of the detected data from the memory 42 based on the data amount to be transmitted at one time of the wireless transmitting operation, which is stored in the memory 42 and the RF unit 43 wirelessly transmits the predetermined amount of the detected data read by the wireless transmitting unit 4 to the external device. Next, at a step S155, the voltage detecting unit 6 detects a voltage $E_{2-n}$ of the electric storage element 3 and a value of the voltage $E_{2-n}$ is stored in the memory 42 of the wireless transmitting unit 4.

Next, at a step S156, the wireless transmitting unit 4 calculates an equation of "$D = E_0/2 - (E_{1-n}+E_{2-n})/2$". In the case where "D" is larger than an upper threshold UT at the step S156, the process S150 shifts to a step S157. At the step S157, the data amount to be transmitted at one time of the wireless transmitting operation is decreased (as a result, the voltage $E_2$ increases) or the time interval Δt is increased (as a result, the voltage $E_1$ increases). On the other hand, in the case where "D" is less than a lower threshold LT at the step S156, the process S150 shifts to a step S158. At the step S158, the data amount to be transmitted at one time of the wireless transmitting operation is increased (as a result, the voltage $E_2$ decreases) or the time interval Δt is decreased (as a result, the voltage $E_1$ decreases). After the step S157 or the step S158, the process S150 shifts to a step S159. At the step S159, the variable number n is incremented and then the process S150 returns to the step S153. On the other hand, in the case where "D" satisfies a condition of "LT≤D≤UT" at the step S156, the process S150 ends.

A value of the upper threshold UT is not particularly limited to a specific value, but is preferably equal to or less than $0.2E_0$, more preferably equal to or less than $0.1E_0$ and even more preferably equal to or less than $0.01E_0$. A value of the lower threshold LT is not particularly limited to a specific value, but is preferably equal to or larger than $-0.2E_0$, more preferably equal to or larger than $-0.1E_0$ and even more preferably equal to or larger than $-0.01E_0$. By setting the upper threshold UT and the lower threshold LT so as to satisfy the above conditions, it is possible to reliably make "$(E_1+E_2)/2$" be in the vicinity of $E_0/2$ ($(E_1+E_2)/2 \approx E_0/2$) with the feed-back process.

Further, it is preferable that the data amount to be transmitted and the time interval Δt set at this process S150 are set so that the voltage $E_1$ satisfies a condition of "$0.5E_0 < E_1 \leq 0.7E_0$" and the voltage $E_2$ satisfies a condition of "$0.3E_0 \leq E_2 < 0.5E_0$". With this configuration, it is possible to operate the wireless transmitting device 1 with always keeping the power consumption efficiency η high.

As described above, the wireless transmitting device 1 of this embodiment supplies the electric power from the electric storage element 3 to the wireless transmitting unit 4, detects the voltage $E_1$ and the voltage $E_2$ every time when the electric power is consumed and performs the feed-back process as shown in FIG. 24. Thus, even if the electromotive force $E_0$ of the power generating element 100 varies during the wireless transmitting operation, the income and outgo balance of energy between the power amount $W_{in}$ and the power consumption amount W is maintained and the power consumption amount W and the time interval Δt are controlled so that "$(E_1+E_2)/2$" is in the vicinity of $E_0/2$ ($(E_1+E_2)/2 \approx E_0/2$). Thus, the wireless transmitting device 1 can perform the operations with stability.

Further, in this embodiment, the timer 8 is used for controlling the power consumption timing as described above. Generally, a power amount required for always driving the timer 8 for measuring the time interval is smaller than a power amount required for always driving the voltage detecting unit 6. Thus, the wireless transmitting device 1 of this embodiment can reduce an amount of the electric power stored in the electric storage element 3 and consumed by the other components than the wireless transmitting unit 4 compared with the wireless transmitting devices 1 of the first embodiment to the third embodiment.

The wireless transmitting device 1 and the wireless transmitting system 900 of the fourth embodiment described above can provide the same functions and effects as the wireless transmitting devices 1 and the wireless transmitting systems 900 of the first embodiment to the third embodiment.

Fifth Embodiment

Figure 25:
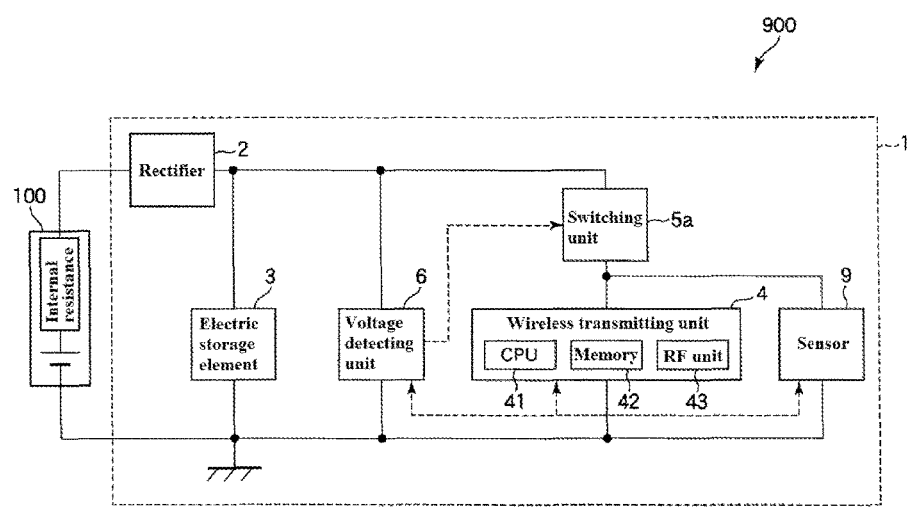
FIG. 25 is a view showing a wireless transmitting device and a wireless transmitting system according to a fifth embodiment of the present invention.

Next, description will be given to a wireless transmitting device and a wireless transmitting system according to a fifth embodiment of the present invention. FIG. 25 is a view showing the wireless transmitting device and the wireless transmitting system according to the fifth embodiment of the present invention.

Hereinafter, the wireless transmitting device and the wireless transmitting system of the fifth embodiment will be described by placing emphasis on the points differing from the wireless transmitting device and the wireless transmitting system of the first embodiment, with the same matters being omitted from description.

A wireless transmitting device 1 and a wireless transmitting system 900 of the fifth embodiment respectively have the same configurations as the wireless transmitting device 1 and the wireless transmitting system 900 of the first embodiment except that the wireless transmitting device 1 includes a sensor 9.

The sensor 9 is the same sensor as the sensor communicatively connected to the wireless transmitting device 1 of each of the other embodiments at the outside of the wireless transmitting device 1. The sensor 9 of this embodiment utilizes the electric power when the switching unit 5a switches the mode from the charging mode to the power consumption mode in the same manner as the wireless transmitting unit 4 to obtain the detected data. The detected data obtained by the sensor 9 is transmitted to the wireless transmitting unit 4 and stored in the memory 42 of the wireless transmitting unit 4 in the FIFO method. After that, the detected data stored in the memory 42 is transmitted to the external device by the RF unit 43. In this embodiment, the power consumption amount W consumed at one time of the wireless transmitting operation is a sum of power consumption amounts of the wireless transmitting unit 4 and the sensor 9.

As described above, in the case where the wireless transmitting device 1 itself includes the sensor 9, it is unnecessary to prepare a power source such as a battery or an external power source for the sensor 9 for obtaining the detected data. Thus, it becomes easier to maintain the sensor 9.

The wireless transmitting device 1 and the wireless transmitting system 900 of the fifth embodiment described above can provide the same functions and effects as the wireless transmitting devices 1 and the wireless transmitting systems 900 of the first embodiment to the fourth embodiment.

Although the wireless transmitting device and the wireless transmitting system of the present invention have been described with reference to the preferred embodiments shown in the accompanying drawings, the present invention is not limited thereto. In the wireless transmitting device and the wireless transmitting system, the configuration of each component may be possibly replaced with other arbitrary configurations having equivalent functions. It may be also possible to add other optional components to the present invention. For example, it may be also possible to combine the configurations according to the first embodiment to the fifth embodiment of the present invention in an appropriate manner.

Further, although the power generating element 100 is an alternating-current source for generating an alternating current and supplying the electric power to the wireless transmitting device 1, the present invention is not limited thereto. The power generating element 100 may be a direct-current power source for generating a direct current and supplying the electric power to the wireless transmitting device 1. In this case, it is possible to omit the rectifier 2 from the wireless transmitting device 1 of each of the embodiments.

INDUSTRIAL APPLICABILITY

According to the present invention, it is possible to set the timing when the wireless transmitting unit consumes the electric power and the power consumption amount of the wireless transmitting unit according to the electromotive force of the energy harvesting element. Thus, it is possible to perform the wireless transmission with a high power consumption efficiency and a high average transmitting rate with using the electric power supplied from the energy harvesting element. For the reasons stated above, the present invention is industrially applicable.

The invention claimed is:

1. A wireless transmitting device using electric power supplied from a power generating element which can generate the electric power by utilizing mechanical energy externally applied, the wireless transmitting device comprising:
    an electric storage element for storing the electric power generated by the power generating element; and
    a wireless transmitting unit for performing a wireless transmitting operation with using the electric power supplied from the electric storage element, the wireless transmitting unit being capable of setting a power consumption amount consumed at one time of the wireless transmitting operation,
    wherein the wireless transmitting device is configured to set a timing when the wireless transmitting unit consumes the electric power and the power consumption amount of the wireless transmitting unit according to electromotive force of the power generating element, and
    wherein when the electromotive force of the power generating element is defined as "$E_0$", a voltage of the electric storage element at the timing when the wireless transmitting unit consumes the electric power is defined as "$E_1$" and a voltage of the electric storage element after the wireless transmitting unit consumes the electric power is defined as "$E_2$", the wireless transmitting device sets the timing and the power consumption amount so that a condition of "$0.3E_0 \leq (E_1+E_2)/2 \leq 0.7E_0$" is satisfied.

2. The wireless transmitting device as claimed in claim 1, wherein the wireless transmitting device sets the timing and the power consumption amount so that the voltage $E_1$ and the voltage $E_2$ respectively satisfy conditions of "$0.5E_0 < E_1 \leq 0.7E_0$" and "$0.3E_0 \leq E_2 < 0.5E_0$".

3. The wireless transmitting device as claimed in claim 1, further comprising:
   a switching unit for switching between a charging mode for storing the electric power generated by the power generating element in the electric storage element and an opening mode for disconnecting a connection between the power generating element and the electric storage element to allow the power generating element to be in an opened state; and
   an electromotive force detecting unit for detecting the electromotive force of the power generating element in the opening mode.

4. The wireless transmitting device as claimed in claim 3, wherein the electromotive force detecting unit detects the electromotive force of the power generating element before the wireless transmitting unit consumes the electric power.

5. The wireless transmitting device as claimed in claim 3, wherein the electromotive force detecting unit periodically detects the electromotive force of the power generating element.

6. The wireless transmitting device as claimed in claim 1, further comprising a voltage detecting unit for detecting a voltage of the electric storage element,
   wherein the wireless transmitting device estimates the electromotive force of the power generating element by detecting the voltage of the electric storage element multiple times.

7. The wireless transmitting device as claimed in claim 6, wherein the wireless transmitting device detects the voltage of the electric storage element multiple times and estimates the voltage of the electric storage element as the electromotive force of the power generating element when a variation amount of the voltage of the electric storage element becomes equal to or less than a predetermined value.

8. The wireless transmitting device as claimed in claim 6, further comprising a timer for measuring a time interval taken for increasing the voltage of the electric storage element by a predetermined amount,
   wherein the wireless transmitting device estimates the electromotive force of the power generating element based on the measured time interval.

9. A wireless transmitting system, comprising:
   a power generating element which can generate electric power by utilizing mechanical energy externally applied; and
   the wireless transmitting device defined by claim 1.

10. The wireless transmitting device as claimed in claim 1, wherein the wireless transmitting unit is configured to perform the wireless transmitting operation for wirelessly transmitting detected data received from a sensor communicatively connected to the wireless transmitting device to an external device.

11. The wireless transmitting device as claimed in claim 1, wherein the wireless transmitting unit is configured to set the power consumption amount consumed at one time of the wireless transmitting operation by changing a data amount to be transmitted at one time of the wireless transmitting operation.

* * * * *